Figure 1B:
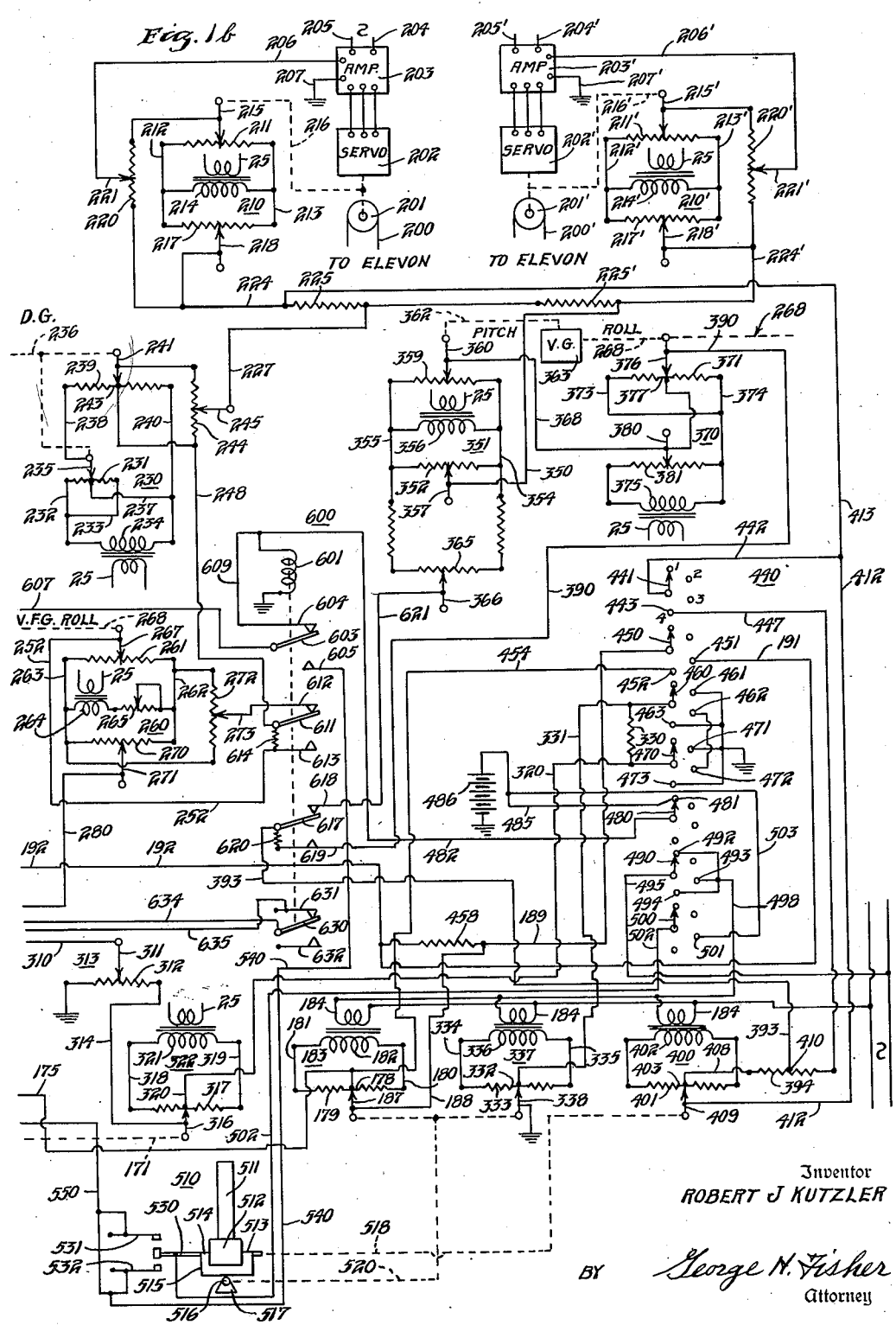

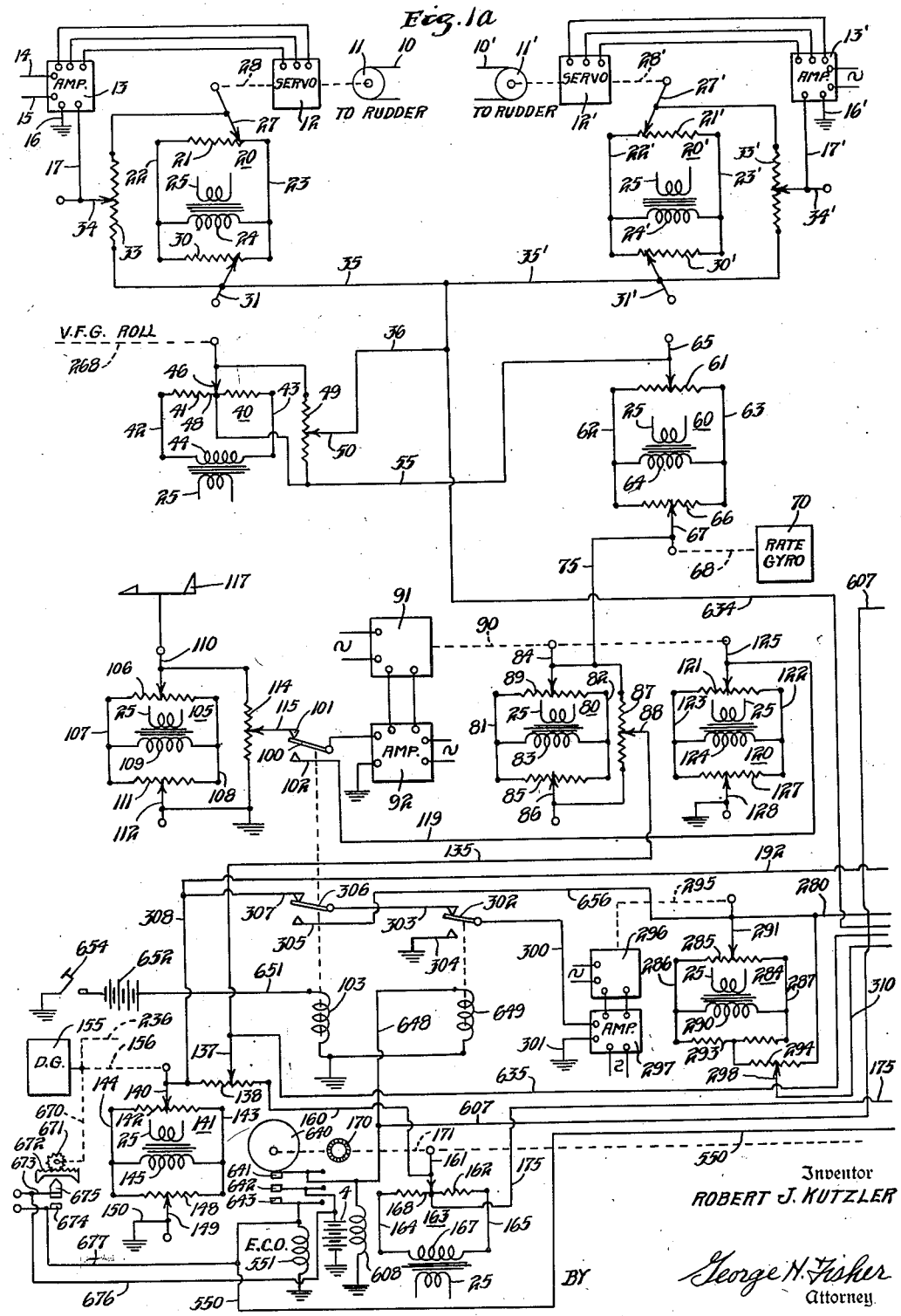

March 31, 1953 — R. J. KUTZLER — 2,633,313
FLIGHT CONTROL APPARATUS
Filed July 12, 1948 — 2 SHEETS—SHEET 2

Inventor
ROBERT J KUTZLER
BY George N. Fisher
Attorney

Patented Mar. 31, 1953

2,633,313

UNITED STATES PATENT OFFICE 2,633,313

FLIGHT CONTROL APPARATUS

Robert J. Kutzler, Minneapolis, Minn., assignor to Minneapolis-Honeywell Regulator Company, Minneapolis, Minn., a corporation of Delaware Application July 12, 1948, Serial No. 38,272

14 Claims. (Cl. 244—77)

This invention pertains to steering mechanisms for dirigible craft such as flight control apparatus for aircraft.

This invention, more specifically is concerned with an arrangement whereby the control surfaces which control the position of an aircraft about three axes may have the power means which operate them manually or automatically controlled.

This invention is an improvement in the control apparatus disclosed in the application of Robert J. Kutzler, Serial Number 14,787, filed March 13, 1948. The aforesaid application discloses control apparatus, for a type of aircraft known as the flying wing, wherein the aircraft may be automatically stabilized in heading and in a horizontal plane and in addition may have its heading altered by a manual controller operating through the apparatus.

It is an object of this invention to provide alternative manual operable means operable in several directions for controlling the aircraft through the control apparatus.

It is a further object of this invention to provide selective positionable means for providing various associations of the alternative manually operable means and the automatic control apparatus of said prior application whereby various operations of the control surfaces are secured.

These and other objects of the invention will be evident from a consideration of the following description with reference to the accompanying drawing disclosing a preferred embodiment thereof.

Figures 1a and 1b together illustrate a schematic arrangement of the component parts of the control apparatus forming the novel subject matter of this invention.

An aircraft of the flying wing type as disclosed in United States Patent 2,412,647 is controlled about its three axes while in flight by two sets of control surfaces. Control about the roll and pitch axes is provided by one set of control surfaces known as elevons which may be operated in opposite directions or in the same direction to provide the well known aileron and elevator function respectively. Control about the turn axis is provided by the other set of control surfaces called rudders.

Turn axis control

As stated above, control of the flying wing about the turn axis is achieved by two so called rudders which are mounted in the outboard extremities of the wing one rudder being provided near each tip of the wing. The function of each rudder is merely to increase the frontal resistance of the side of the wing in which it is mounted. For this reason each rudder may consist of two vanes which may be projected one above and one below the surface of the wing perpendicular to the air stream to increase the drag of such wing in flight. In the apparatus to be described, arrangements have been provided whereby only one rudder is in operated position at one time.

Considering the operating means for each rudder, the left rudder, not shown, is actuated by cables 10 extending from a cable drum 11. The cable drum 11 is driven by a servomotor 12. The servomotor 12 is controlled by an amplifier 13. The amplifier servomotor arrangement may be similar to that disclosed in application 447,989, filed June 22, 1942, or in Patent 2,425,733, issued August 19, 1947.

In the aforesaid application Number 447,989 a servomotor is reversibly controlled by an amplifier. The direction of rotation of the servomotor is controlled by two relays mounted in the amplifier. One or the other of the amplifier relays is operated depending upon the phase relationship between the voltage applied to a control circuit of the amplifier and a source of voltage for the amplifier. Each amplifier relay in the aforementioned application is in series with a limit switch which is operated by the servomotor after limited rotation thereof. After the servomotor has operated a predetermined extent, the limit switch is opened and prevents further operation of the servomotor.

In the arrangement of this invention, each rudder servomotor 12 and 12' is so adjusted with respect to its limit switches that in normal position the servomotor will have opened one limit switch. For example the motor 12 may, in normal position, have opened its limit switch which is in series with the relay contacts in amplifier 13 which are operated when a negative control signal is applied to amplifier 13. Thus even if a negative signal causes the amplifier to operate, the operation of the relay in the amplifier will not effect rotation of servomotor 12. On the other hand a positive signal on amplifier 12 which effects operation of the other relay will cause servomotor 12 to rotate since the other limit switch in series with the other relay is closed. Similarly servomotor 12' in normal position has opened its limit switch which is in series with the relay in amplifier 13' which is operated when a positive signal is applied to amplifier 13'. The servomotor 12' will not be operated when a positive signal is applied to amplifier 13' but will operate when a negative signal is applied. With one limit switch opened in the normal position of the servomotor, only one relay in the amplifier is effective to initiate rotation of the servomotor from its normal position.

The amplifier 13 is connected by means of leads 14 and 15 to a source of voltage, not shown, which may be the inverter or other source of voltage for the aircraft. The control voltage for amplifier 13 is applied across input leads 16 and 17, and the voltage is derived from a circuit extending from lead 17, a rebalancing impedance network 20, lead 35, lead 36, a vertical gyro rudder compensating impedance network 40, a lead 55, a rate gyro signal network 60, a lead 75, a yaw signal network 80, a lead 135, a resistor 138 of a rudder turn control trimmer potentiometer, a directional gyro pickup network 141, lead 150, to ground and to the grounded input lead 16 of amplifier 13.

The impedance network 20 includes a rebalancing potentiometer which has its resistor 21 connected by means of leads 22 and 23 to the opposite ends of a secondary winding 24 of a transformer having a primary winding 25. A wiper 27 of the rebalancing potentiometer is operated by a follow up connection 28 from the servomotor 12.

The servomoter of the aforementioned application also drives a wiper of a rebalancing potentiometer; and when a limit switch has been opened, the wiper has been displaced to a maximum position toward one end of the potentiometer. The position of such follow up wiper on its potentiometer may serve as an indication as to whether a limit switch has been operated. To indicate that each of the rudder servomotors in normal position opens one limit switch in the arrangement of this invention, a wiper on each rebalancing potentiometer as wiper 27 of network 20 assumes a position at one end of the potentiometer when the servomotor is in normal position. In this embodiment therefore, a signal voltage of one phase with respect to a source of voltage will cause one servomotor to operate and the other to remain unoperated whereas a signal of different phase with respect to a source of voltage will cause the second servomotor to operate but the first servomotor will remain unoperated.

Continuing, the network 20 also includes a centering potentiometer which has its resistor 30 connected by means of leads 22 and 23 to the opposite ends of the secondary winding 24. A wiper 31 of the centering potentiometer may be manually adjusted. A rudder ratio potentiometer has one end of its resistor 33 connected to wiper 27 and has the other end connected to wiper 31. The ratio potentiometer has a manually adjustable wiper 34. In normal position, the wiper 27 and the wiper 31 are in the same relative position on their respective resistors at which time there is no difference of potential between wipers 27 and 31. Any change in the relative positions of wipers 27 and 31 will result in a difference of potential which will be applied across the ends of resistor 33. The wiper 34 may be adjusted to select any portion of this potential. Wiper 34 is connected to lead 17.

Since network 20 and other networks to be described are energized by secondary windings which may have a common primary winding, the primary winding is indicated in each instance by the reference character 25.

The rudder compensating network 40 includes a skid potentiometer having a resistor 41 connected by means of leads 42, 43 to the opposite ends of secondary winding 44 of a transformer having a primary winding 25. The skid potentiometer includes a wiper 46 which may be actuated through an operative connection 268 from a vertical flight gyro 363 to be described—due to movement of the aircraft about its roll axis. A skid trim potentiometer has its resistor 49 connected across the wiper 46 and a center tap 48 of resistor 41. A wiper 50 of the skid trim potentiometer may be manually adjusted over the surface of resistor 49 and is connected through lead 36 and lead 35 to wiper 31 of network 20. One end of resistor 49 is also connected to a lead 55.

The rate signal network 60 includes a centering potentiometer having a resistor 61 whose opposite ends are connected by means of leads 62, 63 to the opposite ends of secondary winding 64 of a transformer having a primary winding 25. A wiper 65 of the potentiometer which may be manually adjusted over resistor 61 is connected to the opposite end of lead 55. The network 60 also includes a rate gyro potentiometer having a resistor 66 whose opposite ends are connected to the opposite ends of secondary winding 64. A wiper 67 of the potentiometer may be actuated through an operative connection 68 by a rate gyro 70. The rate gyro 70 may be of the conventional spring restrained type used in turn indicators and applies its precessing movement to wiper 67 on movement of the aircraft about its turn axis. The amount of movement given wiper 67 depends upon the rate at which the aircraft is turning. It may be seen that the network 60 is in the form of a Wheatstone bridge in which an output voltage is derived across wipers 65 and 67 when they are relatively displaced different amounts from the electrical centers of their respective resistors 61, 66. The wiper 67 is connected to one end of lead 75.

The yaw signal network 80 comprises a potentiometer having a resistor 89 whose opposite ends are connected by means of leads 81, 82 to the opposite ends of a secondary winding 83 of a transformer having a primary winding 25. The potentiometer has a wiper 84 which may be adjusted over the surface of resistor 89. The network 80 includes a potentiometer having a resistor 85 connected to the opposite ends of secondary winding 83 by means of leads 81, 82. A wiper 86 may be manually adjusted over the surface of resistor 85. A voltage dividing potentiometer has a resistor 87 which has one end connected to wiper 84 and its opposite end connected to wiper 86. A wiper 88 may be positioned over the surface of resistor 87 and the wiper 88 and resistor 87 constitute a yaw trim potentiometer or voltage divider to select any desired portion of the voltage between wipers 84, 86. Wiper 84 is connected to the opposite end of lead 75. The wiper 84 may be actuated through an operative connection 90 from an alternating current motor 91.

The motor 91 may be reversibly controlled by an amplifier 92. Such amplifier motor combinations are well known in the art and may be of the type shown in the United States patent to Whitman No. 1,942,587 or Anschutz-Kaempfe No. 1,586,233. The direction of motor rotation depends on the phase relation between a control and a supply voltage.

The amplifier 92 is controlled in one instance through a circuit comprising a relay operated switch arm 100, out contact 101, an impedance network 105, to ground, and to the grounded input of amplifier 92. The network 105 includes a yaw pickup potentiometer having a resistor 106 whose opposite ends are connected by means of leads 107, 108 to the opposite ends of a secondary winding 109 of a transformer having a primary winding 25. A wiper 110 may be positioned over the surface of resistor 106 by a vane 117 which responds to the relative wind and aligns itself therewith. The network 105 also includes a vane centering potentiometer having a resistor 111 whose opposite ends are connected to the opposite ends of secondary winding 109 by means of leads 107, 108. A wiper 112 may be manually positioned over the surface of resistor 111. A voltage dividing resistor 114 has one end connected to wiper 110 and its opposite end connected to wiper 112 and to ground. A wiper 115 may be positioned along the surface of voltage dividing resistor 114. The resistor 114 and the wiper 115 constitute a vane trim potentiometer. The wiper 115 is connected to out contact 101.

Normally the direction of heading of the aircraft is aligned with the direction of motion of the relative air and in such condition the wiper 110 is at the electrical center of resistor 106. Any change between the heading of the aircraft and the direction of the relative air is an indication that the aircraft is in a yawed condition which will cause the vane 117 to be rotated thereby displacing wiper 110 along resistor 106. The wiper 112 may be manually adjusted so that in normal position no voltage will appear across wipers 110 and 112. Any voltage appearing across wipers 110, 112 because the aircraft is in a yawed condition will be applied across the ends of resistor 114 and wiper 115 may be positioned along resistor 114 to select any desired portion of this voltage drop.

When switch arm 100 engages out contact 101 to apply the control voltage to amplifier 92 the direction of rotation of motor 91 is dependent upon the phase relationship of the voltage appearing across wipers 110, 112 with respect to the phase of the source of voltage additionally supplied amplifier 92 and motor 91, which may be the inverter previously mentioned.

When switch arm 100 engages its other contact, 102, the network 105 is disassociated from amplifier 92 but the amplifier 92 in this instance has its control elements connected to an additional source of voltage whereby the amplifier 92 may control the motor 91 to recenter the wiper 84.

This additional source of voltage comprises an impedance network 120 which includes a yaw recentering potentiometer having a resistor 121 whose opposite ends are connected by means of leads 122, 123 to the opposite ends of a secondary winding 124 having a primary winding 25. A wiper 125 may be adjusted over the surface of resistor 121 by motor 91 through operating connection 90. Wiper 125 is connected to contact 102 by means of lead 119. The impedance network 120 also includes an aligning potentiometer having a resistor 127 whose opposite ends are connected by means of leads 122, 123 to the opposite ends of secondary winding 124. A wiper 128 which may be manually adjusted over resistor 127 is connected to ground.

During the time that a yaw indicating signal voltage is being obtained, the switch arm 100 may be in engagement with contact 101. Movement of vane 117 is transmitted to wiper 110 which is displaced from the electrical center of resistor 106. This displacement will result in a voltage drop existing between the ends of resistor 114 and a portion of this voltage is applied by wiper 115 through contact 101 and switch arm 100 to one input control lead of amplifier 92, the other input control lead of amplifier 92 being connected to ground as is also the lower end of resistor 114. The voltage drop between wiper 115 and one end of resistor 114 will therefore be applied to the input control elements of amplifier 92 which thereupon operate and cause the motor 91 to position the wipers 84 and 125 through the operating connection 90. The displacement of the wiper 125 will result in a potential being developed across wipers 125 and 128. The switch arm 100 may now be brought into engagement with contact 102, whereby the wiper 125 through lead 119 is connected to one control input of amplifier 92. The other control input to amplifier 92 being connected to ground is also connected to the grounded wiper 128 of network 120. The potential between wipers 125 and 128 being thus applied to the inputs of amplifier 92, the amplifier 92 causes the motor 91 to return the wipers 84 and 125 to their non-operated positions.

The yaw trim potentiometer of impedance network 80 has its wiper 88 connected to one end of lead 135. The opposite end of lead 135 is connected to a wiper 137 of a turn control trimmer potentiometer. This trimmer potentiometer has a voltage divider resistor 138 over whose surface the wiper 137 may be manually adjusted. One end of resistor 138 of the trimmer potentiometer is connected to a wiper 140 of a directional gyro rudder pickup potentiometer. This rudder pickup potentiometer constitutes a portion of impedance network 141 and comprises a resistor 142 whose ends are connected by means of leads 143 and 144 to the corresponding ends of a secondary winding 145 of a transformer having a primary winding 25. The impedance network 141 includes a rudder pickup aligning potentiometer whose resistor 148 has its ends connected to the corresponding ends of secondary winding 145. A manually positioned wiper 149 of the aligning potentiometer is connected by means of lead 150 to ground. The network 141 is therefore in the form of a Wheatstone bridge in which the output is developed across wipers 140 and 149. In normal position, the wipers 140 and 149 are at the electrical centers of their respective resistors 142 and 148 at which time there is no potential difference across the wipers.

The wiper 140 is operated by an actuating connection 156 extending from a directional gyro 155. The directional gyro 155 may be of the conventional type such as that disclosed in the aforementioned application 447,989. In this arrangement the rotor of the directional gyro 155 tends to maintain its direction in space. Through the operative connection 156 the gyro rotor also tends to maintain the wiper 140 in a set position. The resistor 142 on the other hand is mounted on the aircraft and may partake of its movements; therefore, when the aircraft changes its heading by moving about its turn axis the resistor is displaced with respect to the wiper 140.

The resistor 138 of the rudder turn control trimmer potentiometer forms part of the control circuit of the rudder amplifiers 13, 13'. Resistor 138 constitutes part of an additional circuit which extends from its other end, lead 160 to a wiper 161 of a manually operated turn control rudder network 163.

The turn control rudder network 163 has a resistor 162 whose opposite ends are connected through leads 164, 165 to the opposite ends of a secondary winding 167 of a transformer having a primary winding 25. The wiper 161 receives its adjustment through an operative connection 171 from a manually operated turn control knob 173. The resistor 162 has a center tap 168 of considerable width so that it will require an extended displacement of wiper 161 before a difference of potential will exist between wiper 161 and center tap 168. Center tap 168 is connected by means of a lead 175 to a center tap 178 of a resistor 179 included in a formation stick rudder network 183 (Figure 1b). The resistor 179 of the network 183 has its opposite ends connected by means of leads 180, 181 to the opposite ends of a secondary winding 182 of a transformer having a primary winding 184. A wiper 187 of the formation stick rudder potentiometer may be positioned along the surface of resistor 179 and since the center tap 178 of the resistor is of considerable length an extended movement of the wiper 187 is required before a voltage will develop between wiper 187 and center tap 178. The wiper 187 is connected by means of a lead 188 and a lead 189 to a switch arm 450. When switch arm 450 engages a contact 451 it connects with the lead 191 which in turn is connected to a lead 192 to the opposite end of resistor 138 to complete the additional circuit associated therewith.

The right rudder, not shown, is operated by means of cables 10' extending from a cable drum 11' which is operated by a servomotor 12'. The servomotor 12' is controlled by an amplifier 13'. The amplifier servomotor combination for the right rudder is identical with that for the left rudder.

The amplifier 13' is connected to a source of voltage which may be the inverter for the aircraft and additionally has an input control signal applied across input leads 16', 17'. The control input lead 16' is connected to ground and the lead 17' from amplifier 13' is connected through an impedance network 20' and a lead 35' to a portion of a circuit common to amplifiers 13, 13' comprising lead 36, network 40, lead 55, network 60, lead 75, network 80, lead 135, resistor 138, network 141, lead 150 to ground.

The impedance network 20' includes a servomotor operated balance potentiometer having a resistor 21' whose ends are connected by means of leads 22' and 23' to the opposite ends of a secondary winding 24' having a primary winding 25. A wiper 27' of the servo balance potentiometer is moved through a follow up connection 28' from servomotor 12'. The impedance network 20' also includes a centering potentiometer which has a resistor 30' having ends connected through leads 22', 23' to the corresponding ends of secondary winding 24'. The centering potentiometer has a manually adjustable wiper 31' which may be moved over the surface of resistor 30'. The impedance network 20' includes a ratio potentiometer which has its resistor 33' connected across the wipers 27' and 31'. A manually adjustable wiper 34' of the ratio potentiometer may be adjusted over the surface of resistor 33'. Lead 17' from the amplifier connects with the wiper 34', and the wiper 31' is connected through a lead 35' to lead 36 and thence to the common portion of the control circuit for amplifiers 13, 13'.

From what has been stated above it may be observed briefly that each of the rudder amplifier input circuits contains the following:

A source of signal responsive to the movement of the plane about the roll axis and as applied by the vertical flight gyro through network 40;

A rate signal network controlled by a rate gyro 70 which signal is developed in network 60;

A yaw signal network 80 which is controlled by the yaw sensing element 117;

A directional gyro pickup network 141 which responds to changes in heading of the craft;

A manually operated turn control rudder potentiometer 165 for manually initiating operation of the rudder;

A formation stick rudder potentiometer 183 for initiating operation of the rudder by an additional manual means;

And to balance these signal voltages the input for the amplifier also includes a servo balance network 20 or 20' for bringing the circuit of the amplifier back to a balanced condition.

*Elevon control*

The aircraft is controlled about the roll and pitch axes by a single set of control surfaces called elevons whose structure is similar to the conventional ailerons. One elevon is mounted in each wing near the outboard extremity thereof. At times these elevons are moved together in the same direction at which time they effect a movement of the aircraft similar to that obtained by the conventional elevators. At other times the elevons are moved in opposite directions and provide a control effect similar to that provided by the conventional ailerons.

Referring to Figure 1b, the left elevon, not shown, is actuated by a cable 200 extending from a cable drum 201 which is operated by a servomotor 202. The servomotor 202 is reversibly controlled by an amplifier 203. The amplifier servomotor combination may be the same as that disclosed in the aforementioned application No. 447,989, filed June 22, 1942, for operating a control surface. The amplifier 203 has power terminals 204, 205 connected to a source of voltage which may be the inverter for the aircraft. The control input signal for amplifier 203 is applied across connections 206, 207.

The right elevon, not shown, is operated by cables 200' extending from a cable drum 201'. The cable drum 201' is driven by a servomotor 202' which is reversibly controlled by an amplifier 203'. The amplifier servomotor combination is similar to that used for operating the left elevon. The amplifier 203' has connections 204', 205' extending to the same source of voltage as conductors 204 and 205. The control signal for the amplifier 203' is applied across leads 206', 207'.

Since the amplifiers 203, 203' are to control their respective servomotors 202, 202' to effect the aileron and elevator action of the elevons, it is necessary to provide two types of controls for the amplifiers 203, 203'. The control of the amplifiers whereby the servomotors 202, 202' are operated to move the elevons in opposite directions to obtain the aileron function will be considered first.

The aileron control signal to the amplifier 203 which is applied across input leads 206, 207 is derived from a circuit extending from lead 206, an impedance network 210, lead 224, a resistor 225, a lead 227, an impedance network 230, a lead 248, a switch arm 611, out contact 613, lead 252, an impedance network 260, lead 280, an impedance network 284, lead 310, an aileron turn control trimmer potentiometer 313, lead 314, a turn control aileron network 322, lead 320, a switch arm 470, a contact 472, a contact 462, a switch arm 460, lead 331, a formation stick banking network 337, wiper 338 to ground and to amplifier ground lead 207.

Impedance network 210 comprises a servo balance potentiometer which has a resistor 211 connected across a secondary winding 214 by leads 212, 213, said secondary winding 214 having a primary winding 25. A wiper 215 of the servo balance potentiometer is adjusted over the surface of resistor 211 by means of a follow-up connection 216 extending from servomotor 202. The impedance network 210 includes a centering potentiometer having a resistor 217 which is connected across secondary winding 214. A wiper 218 of the centering potentiometer may be manually adjusted over the surface of resistor 217. A voltage dividing resistor 220 has one end connected to wiper 215 and its other end connected to wiper 218. A tap 221 may be manually adjusted over the resistor 220. The resistor 220 and tap 221 constitute a ratio potentiometer whereby any desired portion of the voltage between wipers 215, 218 may be selected. The input lead 206 connects with wiper 221. Wiper 218 of network 210 is connected through lead 224 to one end of the resistor 225.

The impedance network 230 comprises a directional gyro banking potentiometer having a resistor 231 whose opposite ends are connected to the same end of a secondary winding 234 of a transformer having a primary winding 25. A broad center tap of resistor 231 is connected through lead 237 to the opposite end of secondary winding 234. A wiper 235 is adjusted over the surface of the banking potentiometer resistor 231 through an operative connection 236 from the directional gyro 155. The wiper 235 is connected by means of a lead 238 to one end of a resistor 239 which constitutes a portion of a second directional gyro banking potentiometer. The opposite end of resistor 239 is connected by means of leads 240, 237 to the center tap of resistor 231. A wiper 241 may be adjusted over the surface of resistor 239 through an operative connection 236 from directional gyro 155. Network 230 includes a bank trim potentiometer or voltage divider having a resistor 244 one end of which is connected to wiper 241 and the other to the broad center tap 243 of resistor 239. A wiper 245 may be manually adjusted along resistor 244 and this wiper 245 is connected by means of lead 227 to the opposite end of resistor 225. The end of resistor 244 connected to the center tap 243 is also connected by means of a lead 248 to switch arm 611.

Impedance network 260 includes a vertical flight gyro roll axis potentiometer which has a resistor 261 and a wiper 267. The resistor 261 has one end connected through lead 263 to one end of a secondary winding 264 of a transformer having a primary winding 25; the opposite end of resistor 261 is connected by means of lead 262 and a variable resistor 265 to the opposite end of secondary winding 264. The wiper 267 is adjusted over resistor 261 by an operative connection 268 from a vertical flight gyro. The wiper 267 is connected by means of lead 252 to an out contact 613 which may be engaged by arm 611 when the arm is in the lower position. Impedance network 260 also includes an aileron centering potentiometer which has a resistor 270. One end of resistor 270 is connected by means of lead 263 to one end of secondary winding 264 and the other end is connected through lead 262 and variable resistance 265 to the other end of secondary winding 264. A wiper 271 may be manually adjusted over the surface of resistor 270. The impedance network 260 is provided with an additional potentiometer whose resistor 272 has one of its ends connected directly to one end of secondary winding 264 and has its other end connected through variable resistance 265 to the opposite end of secondary winding 264. The additional potentiometer has a wiper 273 adjustable over the surface of resistor 272. This wiper 273 is connected to the in contact 612 which coacts with switch arm 611. A lead 280 extends from wiper 271 of network 260 to impedance network 284 (Figure 1a).

Impedance network 284 includes a potentiometer having a resistor 285 whose opposite ends are connected by means of leads 286 and 287 to the opposite ends of a secondary winding 290 of a transformer having a primary winding 25. The impedance network 284 also includes a resistor 293 which has its opposite ends connected to the corresponding ends of secondary winding 290 by means of leads 286, 287. A voltage dividing potentiometer has a resistor 294 having one of its ends connected to a center tap of resistor 293 and has its opposite end connected to lead 280 and thereby to wiper 291. A wiper 298 may be manually adjusted along the surface of resistor 294. Wiper 291 is actuated by an operative connection 295 extending from a motor 296.

The motor 296 is reversibly controlled by an amplifier 297. The amplifier 297 and motor 296 may be similar to amplifier 92 and motor 91 previously described. The control input voltage source for amplifier 297 comprises a circuit extending from input lead 300, switch arm 302, out contact 303, switch arm 306, out contact 307, lead 308, impedance network 141, lead 150 to ground, and to the grounded input terminal 301 of amplifier 297.

Wiper 298 of network 284 is connected by means of lead 310 to wiper 311 of the aileron turn control trimmer potentiometer 313 (Figure 1b). One end of a voltage dividing resistor 312 of the potentiometer 313 is connected to ground and the opposite end of resistor 312 is connected by means of lead 314 to wiper 316 of the turn control aileron potentiometer. The turn control aileron potentiometer includes a resistor 317 whose opposite ends are connected by means of leads 318, 319 to the opposite ends of a secondary winding 321 of a transformer having a primary winding 25. The wiper 316 which may be positioned over the surface of resistor 317 derives its movement through an operative connection 171 from the turn control knob 170. A center tap of resistor 317 may be connected by means of lead 320, switch arm 470, contact 472, contact 462, switch arm 460 to lead 331; network 337 to ground and to the grounded end of resistor 312.

Network 337 comprises a formation stick banking potentiometer having a resistor 333 whose opposite ends are connected by means of leads 334, 335 to the corresponding ends of a secondary winding 336 of a transformer having a primary winding 184. A wiper 338 of the formation stick banking potentiometer is connected to ground.

The amplifier 203′ which controls the operation of servomotor 202' for the right elevon is itself controlled by a circuit extending from input lead 206', impedance network 210', lead 224', resistor 225', lead 227, impedance network 239, lead 248, switch arm 611, out contact 613, lead 252, impedance network 260, lead 280, impedance network 284, lead 310, trimmer potentiometer 313, lead 314, resistor 317 of the turn control aileron potentiometer, lead 320, switch arm 470, contact 472, contact 462, switch arm 460, lead 331, formation stick banking network 337, to ground, and to the grounded terminal 207' of amplifier 203'.

Impedance network 210' comprises a servo balance potentiometer which has a resistor 211' whose ends are connected through leads 212', 213' to the opposite ends of a secondary winding 214' of a transformer having a primary winding 25. A wiper 215' is adjusted over the surface of resistor 211' by means of a follow up connection 216' extending from servomotor 202'. The impedance network 210' includes a centering potentiometer which has a resistor 217' and wiper 218'. The ends of resistor 217' are connected by leads 212', 213' to the opposite ends of secondary winding 214'. The wiper 218' may be manually adjusted over the surface of resistor 217'. A ratio or voltage dividing potentiometer has a resistor 220' which is connected across wipers 215' and 218'. A tap 221' may be adjusted along resistor 220'. Tap 221' is connected to lead 206'. Lead 224' is connected to the junction of wiper 218' and resistor 220'. The lead 224' extends to one end of resistor 225', and the opposite end of resistor 225' is connected to lead 227. The additional impedance elements which form a portion of the control circuit for amplifier 203' for providing aileron action have been previously described in connection with the input circuit of amplifier 203.

Briefly it appears from what has been described above that the control circuits for the respective amplifiers 203, 203' for the elevons which circuits provide the aileron effect includes as follows: a network 230 which is controlled by the directional gyro upon deviations of the aircraft about the vertical axis; an impedance network 260 controlled by the vertical flight gyro upon movements of the craft about the roll axis; a network 284 for applying a permanent retrim signal upon deviations about the turn axis; a manually controlled aileron potentiometer operated by the turn control knob 170 to provide banking of the plane when it is manually turned; a formation stick banking network 337 whereby the plane may be banked when an additional manual control is operated; and a balancing network driven by the motor which positions the control surface whereby the input circuit for the amplifier is balanced.

*Elevator control of the elevons*

The control circuits previously described for amplifiers 203, 203' whereby aileron action is obtained include as a portion thereof the space between the grid and cathode of a tube in amplifiers 203, 203'. In general, the current between the grid and cathode of such tube is so small that it is negligible and such control circuit is considered as not having any current; therefore in absence of current, no voltage drop exists between the ends of resistors 225 and between the ends of resistor 225' from the control circuits effecting aileron operation of amplifiers 203, 203'. However, in a control circuit for amplifier 203 and amplifier 203' for obtaining elevator action of amplifiers 203, 203', a voltage drop across resistor 225 and resistor 225' is provided. Where operation of the amplifiers 203 and 203' is effected to produce elevator action the resistors 225, 225' serve as voltage dropping resistors.

The voltage drop across resistors 225, 225' is obtained from a circuit extending from the right end of resistor 225', lead 350, impedance network 351, lead 368, impedance network 370, lead 390, out contact 619, switch arm 617, lead 393, to the mid-point of a resistor 394, through the left portion of resistor 394, lead 408, formation stick elevator potentiometer 400, lead 412, lead 413, resistor 225, and to the left end of resistor 225'. Thus the combined voltages across networks 351 and 370 the left hand portion of resistor 394 and network 400 are applied to resistor 225 and 225' in series.

The impedance network 351 comprises an elevon centering potentiometer which has a resistor 352 whose opposite ends are connected by means of leads 354, 355 to the opposite ends of a secondary winding 356 of a transformer having a primary winding 25. A wiper 357 may be manually adjusted over the surface of resistor 352. Lead 350 extends from the right end of resistor 225' to the wiper 357. Impedance network 351 includes a pitch axis pickup potentiometer having a resistor 359 whose opposite ends are connected by means of leads 354 and 355 to the opposite ends of secondary winding 356. A wiper 360 of the pickup potentiometer may be adjusted along resistor 359 and receives such adjustment through a mechanical operating connection 362 from a vertical flight gyro 363. The vertical flight gyro 363 may be of any conventional type, one suitable type being that disclosed in the aforesaid application 447,989. Relative movement between the gyro 363 and the aircraft due to the movement of the aircraft about the pitch axis is transmitted through the operating connection 362 to the wiper 360. An additional potentiometer having a resistor 365 and a wiper 366 has its resistor connected across the ends of the secondary winding 356.

The impedance network 370 comprises an up elevon vertical flight gyro roll axis operated potentiometer having a resistor 371 and a wiper 376. One end of resistor 371 is connected by means of lead 374 to one end of a secondary winding 375 of a transformer having a primary winding 25. The opposite end of resistor 371 is connected by means of lead 373 to the same end of secondary winding 375. The wiper 376 may be adjusted along the surface of resistor 371 by a mechanical connection 268 extending from the vertical flight gyro 363. Relative movements between the aircraft and the vertical flight gyro 363 due to the movements of the aircraft about the roll axis are transmitted through the connection 268 to wiper 376. Impedance network 370 includes an up elevator trimmer potentiometer having a resistor 381 whose opposite ends are connected to the opposite ends of secondary winding 375. A wiper 380 may be manually adjusted over resistor 381. A connection extends from wiper 380 to a center tap 377 of resistor 371. A lead 368 extends from wiper 360 of impedance network 351 to the wiper 380 of impedance network 370.

The formation stick elevator potentiometer 400 comprises a resistor 401 whose opposite ends are connected to the opposite ends of a secondary winding 402 of a transformer having a primary winding 184. A wiper 409 may be adjusted over the surface of resistor 401. The resistor 401 has a broad center tap 403 which connects by means of lead 408 to resistor 394 and through a portion of resistor 394, lead 393, switch arm 617, contact 619, lead 390, to wiper 376 of network 370. Wiper 409 of potentiometer 400 is connected through leads 412, 413, to the left end of resistor 225.

The control circuit for amplifier 203 to obtain elevator action includes two active elements which are the impedance network 210 and the voltage dropping resistor 225. Likewise the control circuit of amplifier 203' for elevator action includes the active resistor 225' and network 210'. Other impedance networks common in the control circuits merely perform a passive function in the input circuit of amplifiers 203, 203' for obtaining elevator action. The inactive portions of the circuits comprise lead 227, impedance network 239, lead 248, switch arm 611, out contact 613, lead 252, impedance network 260, lead 280, impedance network 284, lead 310, trimmer potentiometer 313, to ground.

*Function selector*

A function selector is designated generally at 440. The function selector comprises seven switch sections. Each switch section includes a contact arm and four coacting contacts for the arm. The switch arms of the sections are operatively connected by means not shown for ganged operation. As indicated in the top section, the switch arms may be placed in any of four positions. The position assumed by the function selector determines the interrelationship of the automatic and manual controls for controlling the control surface operating mechanism.

The top or first switch section is associated with elevator control of the elevons and comprises a rotatable switch arm 441, three inoperative contacts which are in the first, second, and third position of the function selector and one operative contact 443 which is in the fourth position of the function selector.

A second switch section is associated with control of the rudders and comprises a rotatable switch arm 450, two inoperative contacts in the first and second function selector positions and two operative contacts 451 and 452 of the third and fourth positions respectively of the function selector.

The third switch section is associated with aileron operation of the elevons and comprises a rotatable switch arm 460, one inoperative contact in the first position of the function selector, and three operative contacts 461, 462, and 463 in the second, third, and fourth positions respectively of the function selector.

The fourth switch section is also associated with aileron operation of the elevons and comprises a rotatable switch arm 470, an inoperative first function selector position contact, an operative second position contact 471, an operative third position contact 472 and an operative fourth position contact 473. A resistor 330 is connected across arm 460 of the third switch section and arm 470 of the fourth switch section.

The fifth switch section is associated with a servo boost relay 600 and comprises a rotatable switch arm 480, an operative first function selector position contact 481, and inoperative second, third and fourth position contacts.

The sixth switch section is associated with primary winding 184 of the formation stick networks and comprises a rotatable switch arm 490, an operative first function selector position contact 492, an inoperative second position contact, an operative third position contact 493, and an operative fourth position contact 494.

The seventh switch section is associated with an erection cutout for the vertical gyro and comprises a rotatable switch arm 500, an inoperative first function selector position contact, an inoperative second position contact, an operative third position contact 501, and an inoperative fourth position contact.

*Formation stick*

A formation stick is generally indicated at 510. This formation stick comprises a manually operable member 511 which has an enlarged lower section 512. The section 512 has laterally extending trunnions 513 and 514 whereby it is mounted in a bifurcated member 515. The bifurcated member 515 is fixed to a shaft 516 which in turn is pivotally supported by two spaced brackets one of which is shown at 517. The mounting of the formation stick is such that when movement is applied to the control member 511 in a fore and aft direction of the aircraft or perpendicular to the plane at the drawing the trunnions 513, 514 pivot in the bifurcated member 515. When the manual member 511 is given a lateral movement in the aircraft or in the plane of the drawing the bifurcated member 515 pivots with shaft 516 rotatably mounted in the brackets 517 which are in the longitudinal plane of the aircraft. It is therefore seen that the movement of the member 511 and trunnions 513 and 514 in the bifurcated member 515 is similar to the movement of the conventional "stick" of the airplane in elevator control and that movement of the members 511, 515 with shaft 516 about the axis in the longitudinally spaced brackets is similar to the movement of the ordinary stick of the aircraft in applying movements of the ailerons. Movement of the member 511 with its trunnions 513 and 514 is communicated through an operative connection 518 to the wiper 409 of the formation stick elevator potentiometer network 400. Movement of the member 515 and shaft 516 is communicated through an operative connection 520 to the wiper 187 of the formation stick rudder potentiometer network 183 and to the wiper 338 of the formation stick banking potentiometer network 337.

A switch arm 530 mounted on the member 515 of the formation stick coacts with two spaced contacts 531 and 532. The spaced contacts 531 and 532 are connected together.

*Servo boost relay*

A servo boost relay is indicated generally at 600. The servo relay comprises an operating coil 601; switch arms 603, 611, 617, 630; in contacts 604, 612, 618, 631; and out contacts 605, 613, 619, 632. Coil 601 when energized operates switch arms 603, 611, 617 and 630 in an upward direction in the figure. The switch arms coact respectively with contacts 604, 605; 612, 613; 618, 619; 631, 632.

A directional arm lock which has a coil 608, Figure 1a, and which may be of the type described in application 447,989 previously referred to coacts with the directional gyro. The directional arm lock serves during manually initiated turns to prevent the transmission of movement from the directional gyro 155 to other elements in the flight control system controlled thereby, including wipers 140, 235, and 241.

The manually operated turn control knob 170 operates through a mechanical connection 171 an eccentric 640. The eccentric 640 coacts with three contact bearing spring arms 641, 642 and 643. Upper arm 641 has a lower contact. Middle arm 642 has an upper and a lower contact. Lower contact arm 643 has an upper contact. Rotation of eccentric 640 in either direction depresses arm 641 and causes the lower contact of arm 641 to engage the upper contact of arm 642 and also depresses arm 642 and thereby causes the lower contact of arm 642 to engage the upper contact of arm 643. The upper arm 641 is connected to the directional arm lock coil 608 and through a lead 648 is also connected to a centering cutout relay coil 649 whose opposite end is connected to ground. The relay coil 649 operates its relay arm 302 which coacts with two spaced contacts 303, 304. The middle arm 642 is connected to a battery 4 whose opposite terminal is grounded. The lower arm 643 is connected to one end of the erection cutout coil 551 which is associated with the erection means for the vertical flight gyro to render such erection means inoperative, as disclosed in the aforementioned application 447,989.

A centering control relay for impedance networks 80 and 284 comprises operating coil 103; switch arms 100, 306; in contacts 102, 305; and out contacts 101, 307. Arm 100 coacts with spaced contacts 101 and 102. Switch arm 306 coacts with spaced contacts 305 and 307. Coil 103 has one end connected to ground and has its other end connected by means of a lead 651 to a battery 652. The opposite end of the battery 652 is connected to a contact of a single-pole single-throw switch whose arm 654 is connected to ground.

A directional gyro panel switch includes upper arm 673 and a lower arm 674. The arm 673 has a contact which may coact with a contact on a switch arm 674. The opposite side of arm 673 has a cam element 675 which coacts with a rack 672. Rack 672 may be driven by pinion 671 on a connection 670 from the directional gyro 155.

Rudder amplifier 13, as stated, is controlled by a signal voltage applied across terminals 16 and 17. The input control circuit previously recited for amplifier 13 includes impedance networks which themselves constitute sources of control or signal voltages. If wipers 27 and 31 of impedance network 20 are not at the same relative position on their respective resistors 21 and 30, a difference of potential will exist between the wipers 27 and 31. This voltage is applied to the ends of resistor 33. A portion of this voltage drop will therefore appear between wiper 34 and the lower end of resistor 33.

Similarly, if wiper 46 is not at the center tap 48 of network 40, a potential will exist between wiper 46 and a center tap 48 which is applied to the ends of resistor 49. A portion of this voltage will appear between wiper 50 and the lower end of resistor 49. This voltage between wiper 50 and the lower end of resistor 49 is in series with the potential between wiper 34 and the lower end of resistor 33.

If wiper 65 and wiper 67 of network 60 are not at the electrical centers of their resistors 61 and 66, but are relatively displaced from such centers a difference of potential will appear across wipers 65 and 67 which is in series with the two previously mentioned voltages.

If wiper 84 and wiper 86 of network 80 have a relative displacement, a voltage difference will exist between wipers 84 and 86 which will be applied across resistor 87. A portion of this voltage will appear between the upper end of resistor 87 and wiper 88 which is in series with the previously mentioned voltages.

If wiper 161 of the turn control rudder potentiometer is not at center tap 168 of resistor 162 a potential difference will exist between wiper 161 and center tap 168. This potential is applied on one hand from wiper 161, lead 160 to one end of resistor 138 and on the other hand from center tap 168, lead 175, formation stick rudder potentiometer network 183, center tap 178 thereof, wiper 187, lead 188, resistor 458, lead 192 to the other end of resistor 138. The potential difference across the ends of resistor 138 may be obtained either from the relative displacement of wiper 161 from center tap 162 of the turn control rudder network 163 or by the displacement of the wiper 187 from center tap 178 of the formation stick rudder potentiometer. A portion of the voltage drop across the ends of resistor 138 will exist between wiper 137 and the left end of resistor 138 which portion is in series with the previously described voltages.

If wiper 140 of the directional gyro rudder pickup potentiometer has a relative displacement with respect to wiper 149 on the centering potentiometer, this voltage so derived will be applied in series with the voltage derived from the turn control trimmer potentiometer resistor 138.

The control voltage for rudder amplifier 13' is obtained from a circuit analogous to that controlling amplifier 13 in that the voltage between wiper 34' and the lower end of resistor 33' is in series with the voltage existing between wiper 50 and the lower end of resistor 49, between wiper 65 and wiper 67, between the upper end of resistor 87 and the wiper 88, between wiper 137 and the left end of resistor 138, and between wipers 140 and 149.

Initially, the input circuit is balanced and is ineffective to cause the operation of amplifier 13. In this ineffective condition of the control circuit, the wipers 27 and 31 are at the same relative positions on their resistors and have no potential between them, the wiper 46 is at the center tap 48 of the roll axis potentiometer 40 and no potential is applied across resistor 49, the wipers 65 and 67 are at the electrical centers of their respective resistors 61, 66 with no potential between them, the wipers 84 and 86 are at the electrical centers of their respective resistors and no potential is applied across resistor 87, the wiper 161 of the turn control rudder network 163 is at its center tap 168 and the formation stick rudder potentiometer wiper 187 is at center tap 178 therefore no potential is applied across resistor 138 and no potential is between wiper 137 and the left end of resistor 138, wiper 140 and wiper 149 are at the electrical centers of their respective resistors 142, 148. In a similar manner, the amplifier 13' is balanced and is inoperative initially at which time wipers 27' and 31' are at the same relative positions on their resistors 21', 30' with no potential between them.

*Function selector position No. 2*

For automatic stabilized flight and manual turn control, the function selector 440 is considered to have been operated so that the respective switch arms of the seven switch sections engage their respective number 2 contacts as indicated in the first section at which position the apparatus operates as that in the aforementioned application 14,787. In other words, the function selector has been actuated from the present number 1 position as shown to the number 2 position. In this position, the formation stick 510 and its potentiometers are ineffective to control the control surfaces.

The secondary winding 182 of the formation stick rudder network, the secondary winding 336 of the formation stick bank network 337 and the secondary winding 402 of the formation stick elevator network 400 have their primary windings 184 connected at one side directly to the source of voltage. The other end of the primaries 184 are connected through lead 498 to the contacts 492, 493 and 494 of the sixth switch section. These contacts are in the first, third, and fourth positions of the function selector. The other side of the source is connected by means of lead 495 to switch arm 490 of the sixth switch section. Since arm 490 is now engaged with the inoperative function selector second position contact the primaries for the formation stick potentiometers are open.

Referring to the fifth section of the function selector, when the function selector 440 is in the second position, the relay coil 601 of the servo boost relay 600 which has one end connected to ground and which has its other end connected through lead 432 to wiper 480 of the fifth switch section has its circuit open since wiper 480 engages the inoperative number 2 contact in the said section. The switch arms 603, 611, 617 and 630 of the servo boost relay are therefore in the lower position or opposite from that shown in the figure.

In the seventh switch section of the function selector, a circuit for energizing the erection output cutout coil is open since wiper arm 500 is now engaged with the inoperative number 2 contact.

The turn control aileron network 322 has its center tap connected through lead 320, to wiper 470 in the fourth switch section and through operative contact 471 to ground. The wiper 316 of the turn control aileron potentiometer is connected to one end of the resistor 312 of the turn control trimmer potentiometer 313. The resistor 312 of this trimmer potentiometer is connected to ground; therefore, movement of wiper 316 with respect to center tap 320 will cause a voltage drop to appear across the resistor 312 of the turn control trimmer potentiometer.

The resistor 138 of the turn control rudder trim potentiometer which has its energizing source supplied either by the turn control rudder potentiometer or the formation stick rudder potentiometer now has a circuit extending from the right end of resistor 138 through the turn control rudder network 162, lead 175, center tap 178 of the formation stick rudder potentiometer, wiper 187, lead 188, resistor 458, lead 192, to the left end of resistor 138. The engagement of wiper 450 of the second switch section with the inoperative second function selector position contact prevents bypassing resistor 458 in the circuit energizing resistor 138.

Since the primary winding 184 which energizes the secondary winding 402 of the formation stick elevator potentiometer 400 has its circuit open at this time, the elevator potentiometer 400 merely serves as a conductor in the impedance network which energizes the resistors 225, 225' of the elevon networks. This energizing circuit extends from the left end of resistor 225, lead 413, wiper 409, center tap 403, the left portion of resistor 394, lead 393, switch arm 617, out contact 619, lead 390, impedance network 370, lead 368, impedance network 351, lead 350, to the right end of resistor 225', through resistor 225' to the right end of resistor 225.

The manner in which impedance networks 351 and 370 energize the resistors 225 and 225' through the above described circuit may be considered. If wiper 357 and wiper 360 of network 351 are at the electrical centers of their respective resistors 359, 352 no voltage across wipers 357 and 360 exists. However, when these wipers 357 and 360 are displaced different amounts from their electrical centers a difference of potential will exist between the wipers and this difference of potential is applied through the aforesaid circuit to the resistors 225 and 225'. In a similar manner, wiper 376 of the roll axis up elevator impedance network 370 is at center tap 377 at which time the network 370 does not supply any voltage to the circuit for energizing resistors 225 and 225'. If wiper 376 be displaced from center tap 377, a difference of potential between the wiper 376 and center tap 377 will exist and this is applied to the aforesaid circuit for energizing resistors 225 and 225'.

The voltage drop across elevator action control resistors 225 and 225' resulting from the voltage derived from either network 351 or network 370 causes the amplifier 203 and amplifier 203' to effect operation of their servomotors 202 and 202' to provide an elevator action to the elevons. Through the discussion which follows, impedance network 351 is considered to be the only network which provides a source of voltage in the elevator circuit for causing a voltage drop across resistors 225 and 225'. Roll axis impedance network 370 is assumed to be in a balanced condition with wiper 376 at center tap 377. The impedance networks 210 and 210' are assumed to be in balanced condition with wipers 215, 218 of network 210 at the electrical centers of their resistors 211 and 217 and wiper 215' at the electrical center of resistor 211' and wiper 218' at the electrical center of resistor 217'.

Assume in any half cycle that the right end of secondary winding 356 of network 351 and of other networks is positive with respect to the left end and that the voltage of the secondary windings have the proper phase relation with respect to the supply to the amplifiers and motors and that wiper 360 has been moved to the right of the electrical center of 359 by the vertical gyro 363. At this time, wiper 360 will be positive with respect to wiper 357 since it is nearer the positive end of secondary winding 356. The wiper 357 is connected through lead 350 to the right end of resistor 225'. The wiper 360 is connected through the previously described circuit to the left end of resistor 225. The lead 227 which connects to the junction of resistors 225 and 225' is connected also as stated to ground. The connection from the junction of resistors 225 and 225' to ground does not modify the voltage drop across resistors 225 and 225'. It merely serves as a ground connection. The left end of resistor 225 is at a higher potential than the right end, and it is connected through impedance network 210 to input lead 206 of amplifier 203. The lead 206 is therefore positive with respect to ground. The right end of resistor 225' is at a lower potential than its left end, and the right end is connected through network 210' to input lead 206' of amplifier 203'. At this time, therefore, the input lead 206' of amplifier 203' is negative with respect to ground. The amplifier 203 having a positive signal on input lead 206 operates oppositely from amplifier 203' which has a negative signal on input lead 206'.

In the amplifier servomotor combination of the aforesaid application 447,989, each amplifier controls two relays or a pair of relays. For a positive signal on the amplifier, one relay may be operated which may control a circuit through a clutch operating solenoid whereby right rotation of a servomotor may be obtained. On the other hand a negative signal on the amplifier may cause the other relay to operate which closes a circuit for a clutch actuating solenoid which effects left rotation of the servomotor. If one servomotor is modified so that its clutch actuating solenoid which effects right rotation of the servomotor is now placed under the control of the amplifier relay operated by a negative signal on its amplifier whereas the other servomotor has its clutch which effects right rotation of the servomotor under the relay controlled by a positive signal on the other amplifier. It is evident that a positive signal on the unmodified servomotor causes right rotation since its relay actuates the switch controlling the circuit through the right rotation clutch solenoid and that on the other hand a negative signal on the amplifier controlling the modified servomotor will energize the relay which has now been associated with the circuit for controlling the right rotation servomotor clutch. Therefore, in the present arrangement a positive signal on amplifier 203 and a negative signal on amplifier 203' causes both servomotors to rotate in the right or in the same direction to raise the elevons. Similarly, a negative signal on amplifier 203 and a positive signal on amplifier 203' causes the servomotors to rotate in the same direction to lower the elevons.

The operation of amplifier 203 due to a voltage drop across resistor 225 causes it to effect rotation of servomotor 202. The servomotor 202 through its follow up connection 216 adjusts wiper 215 with respect to its normal position on resistor 211 and sets up a voltage between wiper 215 and wiper 218 which is applied across resistor 220. Movement of wiper 215 by the servomotor 202 continues until the voltage between tap 221 and the lower end of resistor 220 is equal and opposite to the voltage between the left end of resistor 225 and the right end of the resistor which is connected to ground. In a similar manner the voltage drop across resistor 225' causes the amplifier 203' to effect rotation of servomotor 202'. The servomotor 202' through its follow up connection 216' moves rebelancing wiper 215' to derive a voltage between wiper 215' and wiper 218' which is applied across resistor 220', and wiper 215' is moved until the voltage across wiper 221' and the lower end of resistor 220' is equal to and opposed to that across resistor 225'. Thus up elevator movement has been applied to the elevons.

It has been stated that a positive signal on amplifier 203 and a negative signal on amplifier 203' causes the respective amplifiers to effect rotation of their servomotors 202, 202' in the same direction to raise the elevons. It is apparent that the same signal on each amplifier for example a positive signal on amplifier 203 and a positive signal on amplifier 203' causes them to effect control of their servomotors 202 and 202' so that the servomotors rotate in opposite directions with the left elevon raised and the right elevon lowered. Similarly, a like negative signal on both amplifiers 203, 203' causes them to effect rotation of their servomotors 202 and 202' to rotate in opposite directions to lower the left elevon and to raise the right elevon. This opposite direction of rotation of the servomotors 202, 202' with a like negative signal on each amplifier 203, 203' is the reverse from that obtained by a like positive signal on each amplifier 203, 203'.

If the junction between elevator action control resistors 225 and 225' which has lead 227 connected thereto has its potentials raised above that of ground and if impedance networks 210, 210' are in balanced condition, it is apparent that the input leads 206 and 206' of amplifiers 203, 203' have their potentials raised and are also positive with respect to ground. In such a case the like positive signal on both amplifiers will cause the servomotors 202, 202' to rotate in opposite directions. The junction between resistors 225 and 225' as stated is connected by means of lead 227, directional gyro aileron impedance network 230, lead 248, switch arm 611, contact 613, lead 252, vertical gyro aileron network 260, lead 280, aileron impedance network 284, lead 310, and through the turn control aileron trimmer potentiometer 313 to ground.

We may assume that impedance networks 230, 260, and 284 are in balanced condition.

An aileron control voltage may be obtained from the turn control aileron network 322 by displacing its wiper 316 with respect to its center tap on resistor 317. Suppose in a half cycle that the right end of secondary winding 321 of the turn control aileron potentiometer is positive with respect to its left end. If wiper 316 now be moved to the right from the center tap of resistor 317 it will be positive with respect to the center tap. The wiper 316 is connected to the right end of resistor 312 of the aileron turn control trimmer potentiometer 313. The center tap of resistor 317 is connected through lead 320, wiper 470 of the fourth section in the function selector, contact 471 to ground and to the grounded left end of resistor 312. The wiper 311 of the aileron turn control trimmer potentiometer is therefore positive with respect to ground. The positive voltage on wiper 311 is transmitted through lead 310, impedance network 284, lead 280, impedance network 260, lead 252, out contact 613, switch arm 611, lead 248, network 230, lead 227, to the junction of resistors 225 and 225'. This positive potential is applied through the impedance network 210 to amplifier 203 and through the impedance network 210' to amplifier 203'. Since a positive signal is applied to both amplifiers 203, 203', they will effect operation of their servomotors 202, 202' as to cause them to rotate in opposite directions.

Similarly if wiper 316 be moved to the left of the center tap of resistor 317 and considering again that the right end of secondary winding 320 is positive with respect to the left end, the right end of resistor 312 will be negative with respect to the left end. The potential of wiper 311 therefore will be negative with respect to ground. This negative potential of wiper 311 is transmitted to the amplifiers 203, 203' whereby the servomotors 202, 202' are again caused to operate in opposite directions due to a like negative signal on both amplifiers. The negative signal causes the motors 202, 202' to rotate in reverse directions from the rotations caused by a positive signal on both amplifiers.

A positive signal applied to the junction of the resistors 225, 225' effects opposite direction of rotation of motors 202, 202'. The servomotor 202 positions its rebalancing wiper 215 to the left through the follow up 216 and thereby derives a voltage between the wipers 215 and 218 which voltage is applied across resistor 220. Wiper 215 is moved until the voltage between tap 221 and the lower end of resistor 220 is equal and opposite to that existing between the junction of resistors 225, 225' and ground. The input circuit of amplifier 203 is therefore in balanced condition and the amplifier ceases to operate. Similarly, servomotor 202' positions its wiper 215' to the left through follow up 216' until the voltage between tap 221' and the lower end of resistor 220' is equal and opposite to the voltage between the junction of resistors 225, 225' and ground. It is now apparent how aileron operation of the elevon through the aileron control networks of amplifiers 203, 203' is obtained.

The rudder amplifiers 13, 13' are controlled by circuits which constitute voltage sources. These sources may be varied similarly in a manner to that provided in the control network for the amplifiers 203, 203'. The operation of the amplifiers 13, 13' may be initiated by varying the potential of the junction of leads 35, 35' with respect to ground.

With the rudder signal circuits balanced as stated previously, assume in a half cycle that the right end of secondary winding 145 is positive with respect to the left end. If wiper 140 of the directional gyro rudder impedance network 141 now be moved to the right of the center position on resistor 142 the wiper 140 will be positive with respect to wiper 149 which is connected to ground. The positive potential of wiper 140 is transmitted through turn control trimmer potentiometer resistor 138, lead 135, impedance network 80, lead 75, impedance network 60, lead 55, impedance network 40, lead 36, to the junction of leads 35, 35'. The amplifiers 13, 13' will now have a positive signal applied thereto with respect to their ground connections 16, 16'.

It was stated earlier that each servomotor 12, 12' had operated one of its limit switches to open position when such servomotors had driven their follow up wipers to normal position. The servomotor 12 actuates the left rudder and the right servomotor 12' actuates the right rudder. The servomotor 12' cannot move to the right at this time when a positive signal is applied to the amplifiers since its limit switch is open; although, its amplifier 13' in operating a relay partially closes a circuit through a clutch operating solenoid which circuit includes the opened limit switch. The right servomotor 12' will therefore not operate to open its rudder. The left servomotor 12, however, will, upon operation of its clutch from a solenoid controlled by an amplifier relay, rotate to move its rudder toward the open position. At the same time, the motor 12 through its follow up 28 positions the rebalancing wiper 27 along resistor 21 to set up a voltage between wiper 27 and wiper 31. This voltage is applied across resistor 33. The movement of wiper 27 continues until the voltage between wiper 34 and the lower end of resistor 33 is equal and opposite to that between the junction of leads 35, 35' and ground. At this time the control circuit for amplifier 13 is balanced, and the amplifier no longer operates.

In a similar manner with wipers 27, 27' in normal position, if wiper 140 were moved to the left of its normal position, and if the right end of secondary winding 145 be again considered positive with respect to the left end, the wiper 140 would have a negative potential with respect to ground. This negative potential on wiper 140 is applied to the junction of leads 35, 35' through the previously described circuit. With impedance networks 20, 20' in balanced condition a negative potential at the junction of leads 35, 35' is also applied to input 17 of amplifier 13 and input 17' of amplifier 13'. The negative signal on amplifier 13' causes the amplifier 13' to effect movement of the servomotor 12' which moves wiper 27' to the right from its leftward position. This servomotor 12' at the same time opens the right rudder to increase the drag on the right wing. The wiper 27' is moved by the servomotor 12' to set up a voltage between wiper 27' and wiper 31'. This voltage is applied across resistor 33'. The movement of wiper 27' continues until the voltage between wiper 34' and the lower end of resistor 33' is equal and opposite to that between the junction of leads 35, 35' and ground. When such equal and opposite voltage is set up, the control circuit to amplifier 13' is balanced and the amplifier no longer operates. The servomotor 12' also ceases to rotate.

The servomotor 12 in its normal position where wiper 27 is to the extreme right on resistor 21 has one of its limit switches in open position. This limit switch is in a circuit also controlled by a relay in the amplifier 13. Since the circuit is open at this limit switch the servomotor 12 cannot rotate to apply left rudder even if the relay is operated in response to a negative signal on amplifier 13. Thus it may be seen how the rudder is operated when signals are applied to amplifiers 13, 13'.

Having described the manner in which a control voltage may be derived in the input circuits for the amplifiers 13, 13', 203, 203', the operation of the system for automatic stabilization or number 2 function selector positioned, may be continued.

With the function selector 440 in the number 2 position for conventional control, the aircraft is automatically stabilized in flight. At the time the automatic stabilization is initiated, the various impedance networks are considered individually balanced. The aircraft is assumed to be in level flight position and to be flying on its desired heading. The manually operable recentering switch 654 will have been operated previously to cause the relay 103 to operate recentering control switch arms 199 and 306. If wipers 125 of network 120 and 84 of network 80 had been displaced from their normal position a signal between wiper 125 and grounded wiper 128 would exist. Wiper 125 is connecetde through lead 119, in contact 102, switch arm 100 to one terminal of amplifier 92. The other terminal of the amplifier is grounded and is therefore connected to wiper 128. Any voltage between wiper 125 and 128 would now cause the motor 91 to be operated by amplifier 92. The motor 91 through the operative connection 90 will return wipers 125 and 84 to the normal position on their resistors 121 and 89 respectively.

Similarly, if wiper 291 of network 284 had been displaced from the electrical center of resistor 285, a potential between wiper 291 and the center tap of resistor 293 would exist. Wiper 291 is now connected through lead 656, in contact 305, switch arm 306, out contact 303, switch arm 302, lead 300 to one input terminal of amplifier 297. The other input of amplifier 297 is connected to ground through lead 301. The center tap of resistor 293 is connected through resistor 294, wiper 298, lead 310, wiper 311, resistor 312 of potentiometer 313, and to ground. At this time with the turn control aileron potentiometer in balanced position no voltage is applied across the resistor 312; therefore, the potential of center tap 298 is the same as that of ground. The voltage between wiper 291 and ground being applied to the amplifier 297, the amplifier 297 causes the motor 296 to move the wiper 291 through the operative connection 295 to normal position on the electrical center of resistor 285.

Assume now that switch 654 is opened and that the aircraft is headed in the desired direction, but that it is moving in a direction other than that in which it is headed. The aircraft at this time is therefore flying in a yawed position or yawed attitude. With the aircraft flying in a yawed position, the vane 117 pivots to align itself in the direction in which the aircraft is moving and moves the wiper 110 from the electrical center of resistor 106. If the craft be headed to the left of its direction of movement or yawed to the left, the vane 117 through motor 91 positions wiper 84 of network 80 to the left thereby applying a negative signal on amplifiers 13, 13'. Amplifier 13' effects the positioning of the right rudder to remove the yaw. Any change in heading incurred while yaw is being removed results in rudder control signals being derived from the directional gyro network 141 and the rate gyro network 60 which oppose the signal from yaw network 80. However, since wiper 84 is moved as long as the aircraft is in yaw so that its position depends on time, it is evident that the signal from the yaw network will prevail and force the aircraft to fly without yaw.

Any change in heading, as stated, while correcting for yaw results in the directional gyro 155 through operating means 236 operating the wipers 235 and 241 of the network 230 and wiper 291 of network 284 whereby the aircraft is caused to bank. The effect of the banked position also causes the aircraft to turn to its desired heading. Thus any yawed condition is corrected and the aircraft is maintained on its desired heading. It is evident that the degree of the bank is controlled by the directional gyro and vertical gyro signals with the latter also applying up elevator and modifying the rudder operation. In a similar manner the attitude of the aircraft may be corrected if the craft be yawed to the right.

The aircraft is stabilized about the roll axis by the vertical gyro 363. Should the aircraft tilt to the left about the roll axis, wiper 267 is moved to the left thereby applying a negative signal to the elevon aileron function network causing the left elevon to be lowered and the right elevon to be raised. At the same time wiper 46 of network 40 is moved to the left to apply a negative signal in the signal circuits of amplifiers 13, 13' which results in the operation of the right rudder to check any tendency of the craft to deviate from its desired heading. Under the applied elevon movement the craft returns to normal position. The vertical gyro 363 also moves wiper 376 of network 370 to apply a positive signal to amplifier 203 and a negative signal to amplifier 203' whereby the elevons are moved in an upward direction to prevent loss of altitude.

If the craft tilts to the right, the right elevon is lowered and the left aileron is raised in response to the signal from network 260; the left rudder is operated in response to a signal from network 40; and the left and right elevons are moved upwardly in response to a signal from network 370.

The aircraft is stabilized about the turn axis by the directional gyro 155. For a transient disturbance which turns the craft to the right from its desired heading, the directional gyro 155 moves wiper 140 of network 141 to the right to apply a positive signal on rudder amplifiers 13, 13' resulting in the operation of the left rudder. Network 141 also applies a signal to the aileron network and thus to amplifiers 203, 203' resulting in the raising of the left elevon and lowering of the right elevon.

Since the disturbance is transient in nature and since the motor 296 slowly drives wiper 291, the network 284 will not supply any appreciable voltage. Under the applied elevons the craft banks which is sensed by the vertical gyro 363. Gyro 363 operates wiper 267 of network 260 to supply a signal to limit the amount of the bank; operates wiper 46 of network 40 to return the left rudder toward normal; and operates wiper 376 of network 370 to apply up elevon. As the craft as thus banked turns toward the desired heading, the directional gyro operated wipers move toward normal position and the bank decreases as the desired heading is approached. The rate gyro 70 operates wiper 67 alternately to check deviation due to the transient disturbance and to damp the tendency of the craft to overshoot the desired heading. It appears obvious from the above that left deviations are similarly corrected. Deviations about the pitch axis are corrected by vertical gyro 363 which operates wiper 360 in one or the other direction depending on the deviation. By the above four operations the aircraft is stabilized while the function selector is in the number 2 position.

*Function selector No. 3 position*

In the number 3 position of the function selector, the aircraft is automatically stabilized in flight but the formation stick 511 may be operated to change the attitude of the craft about the turn, roll, and pitch axes. In the number 3 position, contact arm 490 of the sixth switch section engages contact 493 and the circuit through the primaries 184 of the formation stick potentiometers 183, 337, and 400 is completed.

The circuit for energizing resistor 312 of the aileron turn control trimmer potentiometer 313 now extends from the right end of resistor 312 through lead 314, through the turn control aileron potentiometer, lead 328, wiper arm 470, contact 472 of the fourth section, contact 462 of the third section, arm 460, lead 331, the formation stick banking potentiometer 337 to ground and to the left end of resistor 312. The formation stick banking network 337 is thus included in the circuit for applying a voltage drop across resistor 312.

The circuit for energizing resistor 138 of the turn control rudder trim potentiometer extends from the right end of resistor 138, through lead 160, turn control rudder potentiometer 162, lead 175, the formation stick rudder network 183, lead 188, lead 189, switch arm 450, contact 451, lead 191, lead 192, and lead 308 to the left end of resistor 138. It is seen that the circuit which now supplies a voltage drop across resistor 138 of the rudder turn control trim potentiometer by-passes resistor 458. Resistor 458 and resistor 138 previously constituted a voltage divider. Now resistor 138 alone is the voltage divider. The voltage drop across resistor 138 is now increased over that obtained when resistor 458 was in series with it. In other words at this time the rudder turn control trimmer potentiometer comprising wiper 137 and resistor 138 provide a course control signal for the control circuits of amplifiers 13, 13'.

The aircraft may now fly under the stabilizing effects of the directional gyro and the vertical gyro to maintain the aircraft on a desired heading and in level flight laterally and longitudinally and to maintain unyawed flight attitudes.

If the pilot wishes to change the heading of the aircraft he may operate the formation stick 511 in a lateral direction or in the plane of the drawing. The formation stick 511 with member 515 will rock about the axis of shaft 516. The switch arm 530 will engage contacts 531 or 532 depending upon the direction in which the stick 511 is moved. It is immaterial whether arm 530 engages contact 531 or contact 532 since the effect is the same. The engagement of arm 530 with contact 531 closes a circuit from battery 486, lead 503, contact 501 in the seventh section, arm 500, lead 502, arm 530, contact 531, or 532, lead 550, erection cutout coil 551 to ground, and to the grounded side of battery 486. The energization of coil 551 operates the erection cutout system to prevent false erection about the roll axis in the vertical flight gyro 363 as stated.

At the same time a circuit extends from battery 486, lead 503, contact 501, arm 500, lead 502, arm 530, contact 531 or 532, lead 540, contact 605, arm 603, lead 607, coil 608, to ground, and to the grounded side of battery 486. The energization of coil 608 operates the directional arm lock for the directional gyro 155 as disclosed in aforementioned application 447,989 to prevent the transmission of movement to wiper 140 of network 141 and to prevent other operative movement from directional gyro to be transmitted to other elements of the system.

We may assume that the pilot wishes to turn the aircraft to the right from its desired or present heading. The pilot moves the stick 511 to the right and thereby engages switch arm 530 with contact 531 to operate the directional arm lock coil 608 and erection coil 551 as described. The right hand terminals of the secondary windings of the various impedance networks and potentiometers are considered positive with respect to the left ends in the particular half cycle under consideration. The formation stick 511 when moved to the right displaces wiper 187 of the formation stick rudder network 183 and the wiper 338 of the formation stick aileron network 337 to the right from their respective center taps 178 and 332.

Wiper 187 is positive with respect to its center tap 178. The center tap 178 is connected through lead 175, the turn control rudder network 163, lead 160 to the right end of resistor 138. The wiper 187 is connected through lead 188, lead 189, switch arm 450 of the second section, contact 451, lead 191, lead 192, lead 308 to the left end of resistor 138. The left end of resistor 138 is therefore positive with respect to the right end, and the left end of resistor 138 is positive with respect to wiper 137. The negative potential of wiper 137 is applied to amplifier 13 and to amplifier 13'. The left end of resistor 138 is connected through network 141, lead 150 to ground and to the grounded sides of amplifiers 13 and 13'. The amplifier 13' effects the operation of servomotor 12' which operates the right rudder. The drag on the right wing is now increased.

Wiper 338 of the formation stick aileron network 337 is now positive with respect to center tap 332. Wiper 338 through its ground connection is extended to the grounded side of resistor 312 of the aileron turn control trim potentiometer 313. The center tap 332 is connected through lead 331, switch arm 460 of the third section in the function selector, contact 462, contact 472, arm 470 in the fourth section, lead 320, through the aileron turn control network 322, lead 314 to the right end of resistor 312. The left end of resistor 312 is positive with respect to the right end, and the wiper 311 is negative with respect to the left end of resistor 312. The left end of resistor 312 is connected through ground to ground leads 207, 207' of amplifiers 203, 203'. Wiper 311 is connected in the aileron control network as described to amplifier 203 and to amplifier 203'. The negative signal on amplifier 203 causes it to operate and through servomotor 202 effects the lowering of the left elevon. The servomotor 202 also displaces the wiper 215 of network 210 to the right until the voltage between wiper 221 and the lower end of resistor 220 is equal and opposite to that between wiper 311 of potentiometer 313 and the left end of resistor 312. At this time the control circuit for amplifier 203 is in balance and the amplifier 203 stops operating.

The amplifier 203' responds to the negative signal and causes servomotor 202' to raise the right elevon. The servomotor 202' moves wiper 215' of network 210' to the right until the voltage between wiper 221' and the lower end of resistor 220' is equal and opposite to that between wiper 311 and the grounded side of resistor 312. At this time, the control circuit for amplifier 203' is in balanced condition and the amplifier stops operating.

The operation of the right rudder and the lowering of the left elevon and raising of the right elevon causes the plane to turn and bank to the right. The tilting of the plane to the right about the roll axis causes the vertical flight gyro 363 to move wiper 267 of banking network 260, wiper 376 of up elevator network 370, and wiper 46 of rudder network 40.

The positioning of wiper 46 to the right raises its potential with respect to center tap 48 and wiper 50 is now positive with respect to the lower end of resistor 49. The positive voltage from network 40 opposes the negative voltage applied to the amplifier circuits from resistor 138. The circuit of amplifier 13' is therefore positive at this time due to the excess of positive voltages over negative voltages. The amplifier 13' causes its servomotor 12' to reverse on this positive signal and moves the operated right rudder back toward the closed position. Since the positive voltage from network 40 may not be in excess of the negative voltage drop across resistor 138, the control circuit for amplifier 13 does not have a positive unbalance and therefore the servomotor 12 is not operated.

The movement of wiper 376 in the network 370 is to the right and raises its potential with respect to center tap 377 of resistor 371. Wiper 376 is connected to the left end of resistor 225 as described. The right end of the resistor is connected to ground through the aileron control signal circuit. The center tap 377 of network 370 is connected to the right end of resistor 225'. The left end of resistor 225' forms a junction with the right end of resistor 225 to complete the circuit. The left end of resistor 225' like the right end of resistor 225 is also connected to ground through the amplifier control circuit effecting aileron operation. The left end of resistor 225 is positive with respect to its right end and is connected as described to amplifier 203. The amplifier 203 responds to the positive signal applied to it and causes the servomotor 202 to raise the left elevon. The wiper 215 is also positioned by the servomotor 202 toward the left to balance the control circuit of amplifier 203. The right end of resistor 225' which is negative with respect to the left end is connected as stated to input lead 206' of amplifier 203'. The left end of resistor 225' is connected through lead 227 to a portion of the control circuit for amplifier 203' which effects aileron control. This circuit continues from the grounded side of this aileron control circuit to the grounded side of lead 207'. The amplifier 203' receives a negative signal at this time and raises the right elevon. The wiper 215' is moved by servomotor 202' toward the left to balance the control circuit of amplifier 203'. Thus up elevator action of the elevons is automatically applied while the craft is turning to offset the tendency to lose altitude in a turn.

The movement of wiper 267 of network 260 by vertical gyro 363 in a right bank is to the right and therefore causes the wiper 267 to be positive with respect to wiper 271 of network 260. Wiper 267 is connected as described to amplifiers 203, 203'. Wiper 271 is connected to ground and to the grounded sides of amplifiers 203, 203'. The positive signal on amplifier 203 causes the amplifier 203 through servomotor 202 to raise the left elevon from its lowered position.

The amplifier 203' in response to the positive signal causes the servomotor 202' to lower the raised right elevon.

The net effect on the position of the elevons due to the aileron and elevator signals for the amplifier as obtained from the operation of the vertical flight gyro 363 is such as to leave both elevons in a slightly raised position but the plane is in its selected banked position.

When the aircraft approaches the desired heading, the pilot moves the formation stick 511 back to normal position and therefore moves the wipers 187 and 338 back to the center position of their resistors 179 and 333. The movement of wiper 187 back to center tap 178 removes the voltage drop across resistor 138 of the rudder turn control trimmer potentiometer. This decreases the negative voltage supplied to the control circuits of amplifiers 13, 13'. The voltage to the control circuits of amplifiers 13, 13' has a negative voltage decrease. The control circuit of amplifier 13 therefore has a positive unbalance and the amplifier 13 causes the servomotor 12 to move the left rudder toward an open position. The servomotor 12 also moves wiper 27 towards the left to balance the control circuit of amplifier 13.

Since the wiper 338 of the formation stick aileron potentiometer 337 is now at the center tap 332, no potential drop will appear across trimmer resistor 312. The control circuits for amplifiers 203, 203' will now be provided with a positive unbalanced voltage. The amplifier 203 in response to the positive signal causes the servomotor 202 to raise the left elevon. The amplifier 203' in response to the positive signal on its control circuit causes the servomotor 202' to lower the right elevon.

The raising of the left elevon and the lowering of the right causes the aircraft to lessen its tilt about the roll axis. In other words the aircraft is moved from the right depressed angular position counterclockwise toward a level position.

The vertical flight gyro 363 responds to the change in the position of the aircraft about the roll axis. The vertical flight gyro now moves wiper 267 of network 260 toward the left, moves wiper 376 toward the left and moves wiper 46 of network 40 toward the left.

The movement of wiper 46 toward the left results in a lowering of the positive voltage applied to the control circuit of amplifier 13. The amplifier circuit therefore in effect receives a negative voltage. In response to this negative voltage the amplifier 13 causes the servomotor 12 to move the left rudder toward the closed position.

In the elevator control of the elevons, the movement of wiper 376 toward its center causes the amplifier 203 to receive a negative signal in its control circuit. In response to this negative signal the amplifier 203 causes the servomotor 202 to lower its left elevon.

The amplifier 203' has the negative voltage in its control circuit decreased and in effect has an excess of positive voltage applied thereto. Therefore the amplifier 203' in response to the positive signal causes the servomotor 202' to lower the right elevon.

In the aileron control circuits for the amplifiers 203, 203', the movement of wiper 267 toward the left or toward the center of resistor 261 decreases the positive signal in the control circuits of the amplifiers 203, 203'. The amplifier circuits are now provided with a negative signal which causes the amplifier 203 to effect rotation of servomotor 202 whereby the raised left elevon is lowered. On the other hand the amplifier 203' in response to the negative signal causes the servomotor 202' to raise the lowered right elevon.

The action is continuous, as the wipers 187 and 338 are manually moved toward their center taps 178 and 332, the aileron control circuits for the amplifiers 203, 203' tend to effect a raising of the left elevon and a lowering of the right elevon. This positioning of the elevons tends to decrease the angular tilt of the aircraft, and the vertical gyro in response to the lessening of the tilt provides a signal from network 260 which tends to lower the left elevon and raise the right elevon.

The vertical flight gyro 363 in its control of network 370 of the up elevator control circuit tends to lower both the left and right elevon.

The movement of wiper 46 of the compensating network 40 by gyro 363 toward the left from its right position causes the amplifier 13 to operate motor 12 so that the operated left rudder is moved toward the unoperated position. When the aircraft reaches the desired heading the control networks 260, 40, 370, the formation stick rudder network 183, and the formation stick aileron network 337 are in balanced condition. At this time also the circuits through the erection cutout coil 551 and the directional arm lock coil 608 are open. The aircraft now may be automatically stabilized on the new heading in which it has been placed through the operation of the formation stick 511.

It is also apparent that should the pilot desire he may by operating the formation stick 511 perpendicular to the plane of the drawing cause the displacement of the wiper 409 of the elevator network 400. The network 400 is in series with the networks 351, 370 of the elevator control network for amplifiers 203, 203'. The pilot may therefore apply either additional up elevator or decrease the amount of up elevator which is automatically applied.

*Function selector No. 1 position*

The type of operation provided when the function selector is in the No. 1 position is often referred to as servo boost. In the No. 1 position the directional gyro and the vertical flight gyro are render ineffective to control the input circuits of the various amplifiers. Control of the amplifier circuits is obtained by manual control only.

With the function selector in the Number 1 position, the first, second, third, fourth and seventh sections of the formation stick function selector have their respective switch arms engaging inoperative contacts. In the fifth section the battery 486 is connected through lead 485, contact 481, switch arm 480, lead 482, through coil 601 to ground and to the ground side of the battery 486 whereby a circuit is completed to the coil 601 and it operates to raise the switch arms 603, 611, 617 and 630. In the sixth section of the function selector the switch arm 498 completes a circuit for the primaries 184 of the formation stick of the potentiometers 183, 337, and 400.

The operation of coil 601 causes switch arm 603 to contact the in contact 604. A circuit is now completed from battery 486, lead 485, contact 481, switch arm 480, lead 482, lead 609, in contact 604, switch arm 603, lead 607, directional arm lock coil 608 to ground and to ground side of battery 486. The directional arm lock coil 608 is therefore energized and operates the directional arm lock to prevent the transmission of movement from the directional gyro to elements of the flight control system normally operated thereby. A circuit is also completed from lead 607, lead 648, through coil 649 to ground and to the ground side of battery 486 whereby the coil 649 moves switch arm 302 from engagement with contact 303 into engagement with contact 304.

Amplifier 297 is now isolated from network 284 and aileron trimmer potentiometer resistor 312 otherwise if recentering switch 654 is operated while the turn control knob 170 or the formation stick 511 is operated, motor 296 would not move wiper 291 to center of resistor 285 but to some other position.

The engagement of switch arm 611 with contact 612 interrupts out any signal that might be provided in aileron control network 260 through the operation of the vertical flight gyro. Any voltage that might develop between wiper 267 of network 260 and wiper 273 whose resistor 272 is in parallel with resistor 261 is applied across through the high resistor 614. The vertical flight gyro will now be unable to provide any signal in network 260 controlling the aileron operation of the amplifiers 203, 203'.

The engagement of switch arm 617 with contact 618 interrupts any signal that might be derived from networks 351, 370 which are intermediate the wipers 366 and 376. The wipers 366 and 376 are now the output members for the series connected networks 351 and 370. If these wipers 366 and 376 are directly connected the impedance networks 351 and 370 will not have any output. The actual voltage between wipers 366 and 376 is now applied across high value resistor 629 which is not in series with the effective bridge circuit. The vertical flight gyro will therefore not effect any voltage output from networks 351 and 370 which will control the operation of the control circuits for amplifiers 203, 203' for effecting elevator action of the elevons.

The engagement of switch arm 630 with contact 631 connects the junction of leads 35, 35' in the rudder control circuit with the wiper 137 of the rudder turn control trimmer potentiometer. The wiper 137 and the junction of leads 35, 35' form the output elements of networks 40, 60, and 80. If these outputs are therefore connected together the impedance networks will have no output that will control the operation of amplifiers 13, 13'.

The directional arm lock coil 608 had been energized by the engagement of switch arm 603 with contact 604 therefore the impedance network 141 will have no output to control the operation of the rudder amplifiers 13, 13'.

Assume now that it be desired to turn the aircraft to the right. The formation stick 511 will be tilted to the right in the figure and through the operating connection 520 will displace wipers 187 of the formation stick rudder network 183 to the right and the wiper 338 in the formation stick banding network 337 to the right from their respective center taps 178 and 332. As in previous cases, the right end of the various secondary windings will be considered positive with respect to the left end in the particular half cycle under consideration. Movement of wiper 187 of the potentiometer 183 to the right raises its potential with respect to center tap 178. Center tap 178 is connected through lead 175, the turn control rudder potentiometer 162, lead 160, to the right end of resistor 138. Wiper 187 is connected through lead 188, resistor 458, lead 192, lead 308, to the left end of resistor 138 of the rudder turn control trimmer potentiometer. The left end of resistor 138 is now positive with respect to the wiper 137 which engages the resistor 138. The left end of resistor 138 is connected to ground through network 141 and lead 150. The wiper 137 is connected through lead 635, contact 631, switch arm 630, lead 634, to the junction of leads 35, 35' from where its potential is transmitted on the one hand through network 20 to amplifier 13 and on the other hand through network 20' to amplifier 13'. With the networks 20, 20' previously in balanced condition, the application of a negative signal to each amplifier 13, 13' causes only the operation of servomotor 12'. The servomotor 12 does not operate since in normal position it has opened a limit switch which controls a circuit responsive to a negative signal on amplifier 13. The servomotor 12' operates the right rudder toward open position and also moves wiper 27' to balance the control input circuit for amplifier 13'.

In the formation stick aileron potentiometer 337, the wiper 338 being displaced to the right is at a positive potential with respect to center tap 332. Wiper 338 is connected to ground and through the ground connection of the turn control aileron trimmer potentiometer resistor 312 is connected to the left end of resistor 312. The center tap 332 is connected through lead 331, resistor 330, lead 320, through the turn control aileron potentiometer 317, lead 314, to the right end of resistor 312. The right end of resistor 312 is negative with respect to the left end therefore wiper 311 is negative with respect to the left end or grounded end of resistor 312. The positive left end of resistor 312 is connected through ground to the ground terminals 207, 207' of amplifiers 203, 203'. The wiper 311 is connected through lead 310, network 284, lead 280, network 260, wiper 273, contact 612, switch arm 611, lead 248, network 230, lead 227, to the junction of resistors 225, 225' from which the control circuit on the one hand is transmitted through lead 224, network 210 to amplifier 203 and on the other hand through resistor 225', lead 224', network 210' to amplifier 203'. The amplifiers 203 and 203' now have a negative signal applied to their control circuits. In response to the negative control circuit the amplifier 203 causes the servomotor 202 to lower the left elevon. The amplifier 203' in response to the negative signal raises the right elevon. In response to the lower left elevon and the raising of the right elevon, the aircraft banks toward the right.

If it is necessary to operate the elevons in elevator fashion to maintain the altitude of the craft during this manually initiated turn, the pilot pulls the formation stick 511 toward him. This movement causes the wiper 409 to be displaced to the right of center tap 403 in the formation stick elevator network 400. Wiper 409 is now positive with respect to center tap 403. The potential between the wiper 409 and center tap 403 is applied to amplifiers 203, 203' as described. The amplifier 203 therefore receives a positive signal which causes the servomotor 202 to raise the left elevon. The amplifier 203' now has a negative signal applied thereto which causes it to effect rotation of servomotor 202' whereby the right elevon is raised. When the craft has attained the desired angle of bank, the pilot returns the formation stick to normal lateral position, resulting in the return of the control surfaces to normal position for lateral control.

The aircraft now proceeds in the right turn toward the desired heading. When the aircraft has approached the desired heading, the pilot moves the formation stick 511 to the left of its center position laterally and longitudinally. When the wiper 187 is moved toward the left from its normal position, the voltage drop across resistor 138 in the turn control trimmer potentiometer for the rudder is in the opposite direction. A positive signal is now imposed on amplifier 13 which causes it to operate and move the left rudder toward open position. At the same time the wiper 27 is moved toward the left so that the voltage drop between wiper 34 and the lower end of resistor 33 is equal and opposite to that between the wiper 137 and the left end of resistor 138.

The movement of the wiper 338 of the formation stick banking network 337 to the left from normal reverses the voltage between wiper 338 and center tap 332. The voltage between wiper 311 and the left end of resistor 312 now reverses. The positive voltage applied to the amplifiers 203, 203' operates the amplifier 203 to cause the servomotor 202 to raise the left elevon. The amplifier 203' in response to the positive signal lowers the right elevon.

In the formation stick elevator network 400, the movement of wiper 409 toward the center tap 403 decreases the voltage between them. Amplifier 203 in effect receives a negative signal. This negative signal causes the amplifier 203 to effect rotation of servomotor 202 whereby the left elevon is lowered. Amplifier 203' in effect receives a positive voltage. In response to the positive signal on its control circuit, amplifier 203' lowers the right elevon.

Through the above operation, the aircraft is manually controlled to change the heading thereof, the servomotors acting merely as power boost or power amplifying devices.

*Function selector No. 4 position*

In the No. 4 position, the formation stick rudder and aileron networks 183, 337 are rendered ineffective. In the number four position of the function selector, switch arm 441 in the top section engages contact 443. A circuit is now completed from center tap 403 of the formation stick elevator network 400, lead 408, resistor 394, lead 447, contact 443, switch arm 441, lead 442, lead 412 to wiper arm 409. The resistor 394 now functions as a voltage divider for the potential derived from network 400. A portion of the voltage across the dividing resistor 394 is applied to resistors 225, 225' in a circuit extending from the right end of resistor 394, lead 447, contact 443, arm 441, lead 442, lead 413 through the left end of resistor 225, resistor 225', lead 350, network 351, lead 368, network 370, lead 390, contact 619, switch arm 617, lead 393, to the tap 410 on resistor 394.

In the second section of the function selector the engagement of switch arm 450 with contact 452 renders ineffective for formation stick rudder potentiometer 183 by directly connecting the center tap 176 through lead 454, contact 452, switch arm 450, lead 189, lead 188 to wiper 187.

In the third section of the function selector, the engagement of wiper 460 with contact 463 renders the formation stick bank network 337 ineffective since the center tap 332 and the wiper 338 thereof are directly connected through a circuit extending from center tap 332, lead 331, switch arm 460, contact 463 to ground and to the grounded wiper 338. No potential difference therefore can develop between the wiper 338 and center tap 332.

The aircraft in the number four position of the function selector is automatically stabilized in flight but the formation stick is effective to change the altitude of the aircraft about the pitch axis.

As the aircraft is flying under the stabilizing effects of the automatic control features and should the pilot wish to increase his altitude, he operates the formation stick 511 and pulls it toward him. Through the operative connection 518 the wiper 409 is displaced to the right of its center tap 403. A voltage which now exists between wiper 409 and center tap 403 is applied across the voltage dividing resistor 394. The portion of this voltage utilized in the control of the elevons is that between center tap 410 of resistor 394 and the right end of resistor 394. The right end of resistor 394 is positive with respect to the center tap 410. The left end of resistor 225 is positive with respect to its right end which is connected to ground. The amplifier 203 responds to a positive signal and raises the left elevon and moves wiper 215 to the left to balance.

The right end of resistor 225' is negative with respect to its left end which is connected to ground. The amplifier 203' receives a negative signal in its control circuit and operates its servomotor 202' to raise the right elevon and moves wiper 215' to right. The vertical gyro responds to the change of the plane about the pitch axis and moves wiper 3 to the left. This opposes voltages from network 400 so that the voltage from the elevator network is balanced by the voltages from the servo balance networks and the vertical gyro pitch axis network 351.

When the desired altitude has been reached, the pilot moves the formation stick 511 back to center which moves wiper 409 back to center tap 403. The voltage drop across resistors 225 and 225' is now in the opposite direction. The drop in the voltage across resistor 225 in effect causes a negative signal to be applied to amplifier 203 which operates and causes servomotor 202 to lower the left elevon and move wiper 215 to the right. The voltage drop across resistor 225' in effect applies a positive signal to amplifier 203'. Amplifier 203' in response to the positive signal causes the servomotor 202' to lower the right elevon and position wiper 215' to left. As the plane levels off, the vertical gyro 363 moves wiper 360 toward center. The aircraft now flies at the new altitude selected by the pilot. The networks controlled by the turn control knob 170, the directional gyro 155, vertical gyro 363, and yaw vane 117 continue to be effective.

*Conclusion*

The operation of the flight control system for the four positions of the function selector have now been particularly described. It has been pointed out how the aircraft may be automatically stabilized in flight but yet be made subject to alternative manual control as desired. It was explained further how the control surfaces may compensate for conditions which make the craft yaw or tilt.

Having described a preferred embodiment of my invention, but realizing that changes in the particular details described may be made without departing from the spirit of my invention, I do not wish to confine my invention to the specific structure described but only as defined by the appended claims.

What is claimed as new is:

1. Flight control apparatus for an aircraft having two control surfaces, motor means for each control surface; control means for each motor means; attitude signal generating means responsive to the movement about one axis and connected to said control means to effect operation of said motor means whereby said control surfaces are moved together in the same direction to stabilize said craft about said one axis; attitude signal generating means responsive to the movement about another axis and connected to said control means to effect operation of said motor means whereby said control surfaces are moved in opposite directions to stabilize said craft about said other axis; manual signal generating means connected to said control means to effect operation of said motor means to obtain same or opposite movement of said control surfaces to effect attitude change about both axes; and selector means to render both said attitude responsive signal generating means ineffective to control said control means and for rendering said manual signal generating means effective, whereby opposition to said manual changes of craft attitude by said stabilizing means is prevented.

2. A control system for an aircraft having two control surfaces operable in the same or opposite directions and thus adapted to change the angular position of the aircraft about two axes, and including: control means for operating said control surfaces; a first controller responsive to the angular position of said aircraft about one axis and associated with said control means; a second controller responsive to the angular position of said aircraft about another axis and associated with said control means; a first and a second manually operable controller associated with said control means; the first manually operable controller and a responsively operable controller being so associated with said control means as to cause a positioning of said control surfaces in the same direction, and said second manually operable controller and said other responsively operable controller being associated with said control means as to cause the operation of the control surfaces in opposite directions; and means including switching means associated with said control means and adapted in one position of said switch to disconnect said manually operable controllers from said control means whereby they are ineffective to control said control surfaces and whereby said responsively operated controllers tend to maintain said aircraft in a given angular position about said axes, or in another position of said switch to connect said manually operable controllers with said control means to render them effective to modify the action of said responsively operated controllers, whereby said responsively operable controllers are effective to maintain said aircraft in angular position about said axes determined by said manually operable controllers.

3. A control apparatus for an aircraft having two control surfaces adapted to change the angular position of the aircraft about two axes, and including: motor means operable to position said control surfaces; means responsive to the angular position of said aircraft about said axes; a first and second variable impedance controlled by said responsive means; a first and second manually controlled impedance; a follow up type control system connected to said motor means and including said first and second variable impedances and said manually operated impedances, said control system being effective to control the operation of said motor means in accordance with signals provided by said first variable impedance and by one manually operated impedance whereby said control surfaces are operated together in the same direction, and said control system being effective to control the operation of said motor means in accordance with signals provided by said second variable impedance and by the second manually operated impedance whereby said control surfaces are operated in opposite directions, and switching means adapted to render said manual control means ineffective and said first and second variable impedances effective to control the operation of said motor in such a manner as to tend to maintain said aircraft in a predetermined angular position about said axes, or to render said manually operated impedances effective to produce signals in accordance with the operation of said impedances, and said first and second variable impedances effective to produce signals tending to maintain said aircraft in a given angular position about said axes, whereby said manually operated impedances may be operated to modify the effect of said first and second variable impedances and thereby change the angular position which said first and second variable impedances will tend to maintain.

4. Control apparatus for an aircraft having two control surfaces adapted to change the angular position of the aircraft about two axes, and including: control means associated with said control surfaces, a first controller responsive to the angular position of said aircraft about one axis; a second controller responsive to the angular position of said aircraft about a second axis, both said responsively operable controllers being associated with said control means; a first and a second manually operated controller; the first responsive controller and the first manually operated controller being so associated with said control means as to cause the operation of said surfaces in the same direction, and said second responsive controller and said second manually operated controller being so associated with said control means as to cause the operation of said control surfaces in opposite directions; means including switching means operable in one position to connect both said responsively operated controllers and said manually operated controllers to said control means to render them effective to control said control surfaces so as to maintain said aircraft in a predetermined angular position about said axes with said manually operated controllers effective to vary said predetermined angle or in another position to disconnect said responsively operated controllers from said control means to render them ineffective to control the operation of said control surfaces, whereby said manually operated controllers are effective to control the position of said control surfaces.

5. Control apparatus for an aircraft having two control surfaces adapted to change the angular positions of the aircraft about two axes and including: motor means operable to position said control surfaces; a first controller responsive to the angular position of said aircraft about one axis, a second controller responsive to the angular position of said aircraft about another axis, a first and a second manually operated controller; control means including said manually operated controllers and said responsively operated controllers, and connected to said motor means to control the operation thereof in accordance with signals provided by said controllers, the first responsive controller and the first manually operated controller controlling said motor means to operate the control surfaces in the same direction and the second responsively operated controller and the second manually operated controller controlling the motor means to position the control surfaces in opposite directions; and means including switching means associated with said control means and adapted in one position of said switch to render both responsively operated controllers and both manually operated controllers effective to control the operation of said motor means so as to tend to maintain said aircraft in a predetermined angular position about said axis, which predetermined angular positions may be varied by operation of said manually operated controllers, or in another position of said switch to render said responsively operated controllers ineffective and reduce the effective magnitude of the signals produced by said manually operated controllers to operate said motor means.

6. Control apparatus for an aircraft having two control surfaces adapted to change the angular positions of the aircraft about two axes and including: motor means operable to position said control surfaces, means responsive to the angular position of said aircraft about said axes; a first and second variable impedance controlled by said responsive means; a first and second manually controlled variable impedance; two control circuits including said responsive variable impedances and said manually controlled variable impedances and operable to control the operation of said motor means, said first responsive variable impedance and said first manually operated impedance being connected in one circuit so as to provide signals causing the operation of said motor means whereby said control surfaces are moved together in the same direction; and said second responsive variable impedance and said second manually operated impedance being connected in the second circuit so as to provide signals causing the operation of said motor means to position the control surfaces in opposite directions; and switching means adapted to render said responsive impedances ineffective and said manually controlled variable impedances effective whereby said manually controlled means are effective to control the operation of said control surfaces independently of the angular positions of said aircraft about the two axes, or to render said first and second responsive impedance means and said manually controlled variable impedances effective to cause the operation of said motor means so as to tend to maintain said aircraft in given angular positions about said axes which positions may be modified by the operation of said manually controlled impedances.

7. A control apparatus for an aircraft having two control surfaces adapted to change the position of the aircraft about two axes and including: motor means operable to position said control surfaces; means responsive to the angular position of said aircraft about said axes; a first and a second variable resistor controlled by said responsive means; a first and a second manually controlled variable resistor; rebalancing variable resistors controlled by said motor means; a first controlled circuit of the rebalancing type operable to control the operation of said motor means to cause the positioning of said control surfaces in the same direction and including said first responsive variable resistor, said first manually controlled variable resistor, and said rebalancing resistors, and a second control circuit of the rebalancing type operable to control the operation of said motor means to cause said control surfaces to move in opposite directions and including said second responsive variable resistor, said second manually controlled variable resistor, and said rebalancing resistors, said first and second responsive resistors providing signals which tend to operate said motor means so as to maintain said aircraft in predetermined angular positions about its axes, and said manually controlled resistors providing signals which normally tend to operate said motor means; and switching means operable to render said manually controlled resistors ineffective and said first and second responsive resistors effective to control the operation of said motor means, or to render said manually operated resistors effective to control the operation of said motor means while effectively disconnecting said first and second responsive variable resistors from said control circuits to render them ineffective to control said motor means.

8. A control apparatus for an aircraft having two control surfaces adapted to change the angular position of the aircraft about two axes and including: motor means operable to position said control surfaces; means responsive to the angular position of said aircraft about said axes; a first control device operated by said responsive means in accordance with the position of the aircraft about one axis; a second control device operated by said responsive means in accordance with the position of the aircraft about a second axis; a first and a second manually operated control device; a control system operable to control the operation of said motor means and including said first and second control devices and said first and second manually operated control devices, said first responsive control device and said first manually operated control device being effective to control the operation of said motor means whereby said control surfaces are operated in the same direction, and said second responsive control device and said second manually operated control device being effective to control the operation of said motor means whereby said control surfaces are positioned in opposite directions, and means including switching means associated with said control system and operable in one position of said switch to render said manually operated control devices normally effective, or in another position of said switch to render said second manually operated control device ineffective and said first manually control device less effective but not completely ineffective.

9. A control system for an aircraft having two control surfaces adapted to change the angular positions of the aircraft about two axes and including: control means associated with said control surfaces and including a first controller responsive to the angular position of said aircraft about one axis, a second controller responsive to the angular position of said aircraft about a second axis, a first and second manually operated controller; a first responsive controller and the first manually operated controller being so associated with said control means as to cause the operation of said control surfaces in the same direction and said second responsive controller and said second manually operated controller being so associated with said control means as to cause the operation of the control surfaces in opposite directions; and switching means operable to render said manually operable controllers ineffective and said responsively operated controllers effective to control the operation of said control surfaces, or to render both said responsively operated controllers and said manually operated controllers effective to control the operation of said control surfaces, or to render said responsively operated controllers ineffective and said manually operated controllers effective to control the operation of said control surfaces.

10. Control apparatus for an aircraft having two control surfaces adapted to change the positions of the aircraft about two axes and including: motor means operable to position said control surfaces; motor control means controlling the operation of said motor means and including a first control means responsive to the angular position of said aircraft about one axis, a second control means responsive to the angular position of said aircraft about a second axis, and a first and a second manually operated controller, said first responsive controller and said first manually operated controller controlling said motor control means whereby said control surfaces are moved together in the same direction and said second responsive controller and said second manually operated controller controlling said motor control means whereby said control surfaces are moved in opposite directions; and means including switching means included in said motor control means and selectively operable in a first position of said switch to render said manually operated controllers effective and said responsively operated controllers ineffective to control the operation of said motor means, or in a second position of said switch to render said manually operated controllers and said responsively operated controllers effective to control the operation of said motor means, or in a third position of said switch to render said first manually operated controller effective to a reduced degree, said second manually operated controller ineffective, and said responsively operated controllers effective to control the operation of said motor means.

11. Control apparatus for an aircraft having two control surfaces adapted to change the angular positions of the aircraft about two axes and including a motor means operable to position said control surfaces, motor control means controlling the operation of said motor means and including a first control means responsive to the angular position of said aircraft about one axis, a second control means responsive to the angular position of said aircraft about a second axis, and a first and second manually operated controller; said first responsively operated control means and said first manually operated controller providing signals for the operation of said motor means which causes said motor means to position said control surfaces in the same direction, and said second responsively operated control means and said second manually operated controller providing signals for the operation of said motor means which causes said motor means to position said control surfaces in opposite directions, and means including switching means associated with said motor control means operable in a first position of said switch to render said manually operated controllers ineffective and said responsively operated control means effective to control the operation of said motor means, in a second position of said switch to render said manually operated controllers fully effective and said responsively operated control means fully effective to jointly control the operation of said motor means, or in a third position of said switch to render said first manually operated controller effective to a reduced degree, said second manually operated controller ineffective and said responsively operated control means fully effective to control the operation of said motor means.

12. Control apparatus for an aircraft having two control surfaces adapted to change the angular positions of an aircraft about two axes and including: motor means operable to position said control surfaces; motor control means controlling the operation of said motor means and including a first control means responsive to the angular position of said aircraft about one axis, a second control means responsive to the angular position of said aircraft about a second axis, and a first and second manually operated controller, said first responsively operated controller and said first manually operated controller providing a signal which may be applied to said motor means to cause the motor means to operate so as to move the control surfaces in the same direction, and said second responsively operated controller and said second manually operated controller providing signals which may be applied to said motor means to cause said motor means to position said control surfaces in opposite directions; said motor control means including switching means selectively operable in a first position of said switch to render said manually operated controllers effective and said responsively operated controllers ineffective to cause the operation of said motor means, in a second position of said switch to render said manually operated controllers ineffective and said responsively operated controllers effective to cause the operation of said motor means, in a third position of said switch to render said manually operated controllers fully effective and said responsively operated controllers effective to control the operation of said motor means whereby said responsively operated controllers operate said motor means so as to tend to maintain said aircraft at predetermined angular positions about said axes and said manually operated controllers are effective to vary said predetermined angular positions, or in a fourth position of said switch to render said first manually operated controller effective to a reduced degree, said second manually operated controller ineffective and said responsively operated controller effective to control the operation of said motor means.

13. Control apparatus for an aircraft having two control surfaces movable in the same or in opposite directions to control the position of said aircraft about the pitch or roll axes and an additional control surface to control the aircraft about the turn axis said apparatus comprising: motor means for actuating said control surfaces; control means for operating said motor means; means responsive to movement about said pitch, roll, or turn axis for controlling said control means, and manually operable means for controlling said control means and effective upon movement in one direction to cause operation of said two control surfaces in the opposite directions and the operation of said additional control surface and effective when moved in another direction to cause operation of said two control surfaces in the same direction.

14. Apparatus according to claim 13, including means operable in response to movement of the manually operable means in said one direction to render said means responsive to movement about the turn axis ineffective to control said control means.

ROBERT J. KUTZLER.

REFERENCES CITED

The following references are of record in the file of this patent:

UNITED STATES PATENTS

| Number | Name | Date |
|---|---|---|
| 1,418,335 | Sperry | June 6, 1922 |
| 2,162,862 | Protzen | June 20, 1939 |
| 2,417,821 | Harcum et al. | Mar. 25, 1947 |
| 2,448,712 | Hampshire | Sept. 7, 1948 |
| 2,462,081 | Esval | Feb. 22, 1949 |
| 2,464,629 | Young | Mar. 15, 1949 |
| 2,523,427 | Hampshire | Sept. 26, 1950 |